US012731496B2

(12) United States Patent
Baladhandapani et al.

(10) Patent No.: US 12,731,496 B2
(45) Date of Patent: Sep. 8, 2026

(54) SYSTEMS AND METHODS FOR REAL-TIME, MULTI-FACTOR PREDICTION OF EMERGENCY LANDING SUCCESS PROBABILITIES USING MACHINE LEARNING

(71) Applicant: Honeywell International Inc., Charlotte, NC (US)

(72) Inventors: Gobinathan Baladhandapani, Madurai (IN); Anand Arjunan Kutuva, Bangalore (IN); Sivakumar Kanagarajan, Bangalore (IN)

(73) Assignee: Honeywell International Inc., Charlotte, NC (US)

( * ) Notice: Subject to any disclaimer, the term of this patent is extended or adjusted under 35 U.S.C. 154(b) by 76 days.

(21) Appl. No.: 18/776,933

(22) Filed: Jul. 18, 2024

(65) Prior Publication Data

US 2025/0371986 A1 Dec. 4, 2025

(30) Foreign Application Priority Data

Jun. 4, 2024 (IN) ............................ 202411043302

(51) Int. Cl.
*G08G 5/55* (2025.01)
*B64D 45/04* (2006.01)
(Continued)

(52) U.S. Cl.
CPC ............... *G08G 5/55* (2025.01); *B64D 45/04* (2013.01); *G05B 23/0286* (2013.01); (Continued)

(58) Field of Classification Search
CPC ... G08G 5/55; G08G 5/21; G08G 5/58; G06F 17/18; B64D 45/04; B64D 45/00; B64D 2045/0085; G07C 5/0816
See application file for complete search history.

(56) References Cited

U.S. PATENT DOCUMENTS 9,520,066 B2 12/2016 Spinelli et al.
10,124,893 B1 * 11/2018 Aalund .................. G07C 5/006
(Continued)

FOREIGN PATENT DOCUMENTS

EP 3869486 A1 8/2021
EP 4024370 A1 7/2022
EP 3174029 B1 2/2024

*Primary Examiner* — Jason Holloway
*Assistant Examiner* — Benjamin J Brosh
(74) *Attorney, Agent, or Firm* — Alston & Bird LLP

(57) ABSTRACT

Embodiments of the present disclosure provide systems and methods for real-time, multi-factor prediction of emergency landing success probabilities using machine learning. In one embodiment, a method includes generating, by one or more processors, a first emergency landing success probability value, the first emergency landing success probability value based at least in part on one or more vehicle state conditions for a vehicle; generating, by the one or more processors, a second emergency landing success probability value, the second emergency landing success probability value based at least in part on one or more environmental state conditions for an operating environment of the vehicle; and generating, by the one or more processors, a third emergency landing success probability value based at least in part on the first emergency landing success probability value and the second emergency landing success probability value.

16 Claims, 6 Drawing Sheets

(51) Int. Cl.

| | |
|---|---|
| ***G05B 23/02*** | (2006.01) |
| ***G06F 17/18*** | (2006.01) |
| ***G06N 20/20*** | (2019.01) |
| ***G08G 5/21*** | (2025.01) |
| ***G08G 5/58*** | (2025.01) |
| ***G08G 5/70*** | (2025.01) |

(52) U.S. Cl.

CPC ............. *G06F 17/18* (2013.01); *G06N 20/20* (2019.01); *G08G 5/21* (2025.01); *G08G 5/58* (2025.01); *G08G 5/70* (2025.01)

(56) References Cited

U.S. PATENT DOCUMENTS

| | | | | |
|---|---|---|---|---|
| 10,810,501 | B1 * | 10/2020 | Kimchi | G08G 5/727 |
| 11,562,654 | B2 | 1/2023 | Krawiec et al. | |
| 11,657,721 | B1 | 5/2023 | Suiter et al. | |
| 11,699,351 | B2 | 7/2023 | Suiter et al. | |
| 11,935,420 | B1 | 3/2024 | Suiter et al. | |
| 12,296,978 | B1 * | 5/2025 | Plawecki | G06N 5/01 |
| 2008/0177432 | A1 * | 7/2008 | Deker | G05D 1/0676 701/17 |
| 2016/0225266 | A1 * | 8/2016 | Kang | G08G 5/51 |
| 2016/0229554 | A1 * | 8/2016 | Kawalkar | G08G 5/21 |
| 2018/0322793 | A1 * | 11/2018 | Huang | G08G 5/76 |
| 2021/0132634 | A1 | 5/2021 | Groden et al. | |
| 2022/0198946 | A1 * | 6/2022 | Meek | G08G 5/34 |
| 2022/0204180 | A1 * | 6/2022 | Sellmann | G01C 23/005 |
| 2022/0230551 | A1 * | 7/2022 | Wittmaak, Jr. | G08G 5/30 |
| 2022/0274717 | A1 * | 9/2022 | Akanuma | G05D 1/0676 |
| 2024/0210963 | A1 * | 6/2024 | Stollmeyer | G05B 23/0286 |
| 2025/0124795 | A1 * | 4/2025 | Matsumura | G08G 5/54 |
| 2025/0131836 | A1 * | 4/2025 | Gu | G08G 5/51 |

* cited by examiner

SYSTEMS AND METHODS FOR REAL-TIME, MULTI-FACTOR PREDICTION OF EMERGENCY LANDING SUCCESS PROBABILITIES USING MACHINE LEARNING

CROSS-REFERENCE TO RELATED APPLICATIONS

This application claims priority to and the benefit of foreign Indian Provisional patent Application No. 202411043302, filed on Jun. 4, 2024 with the Government of India Patent Office and entitled "SYSTEMS AND METHODS FOR REAL-TIME, MULTI-FACTOR PREDICTION OF EMERGENCY LANDING SUCCESS PROBABILITIES USING MACHINE LEARNING," the contents of which are incorporated herein by reference in their entirety.

TECHNICAL FIELD

Embodiments of the present disclosure generally relate to the field of transportation, and specifically to systems and methods for real-time, multi-factor prediction of emergency landing success probabilities using machine learning.

BACKGROUND

In various emergency or atypical scenarios, a vehicle may perform one or more operations in the interest of passenger safety. For example, within the context of aviation, an aircraft may perform an automated emergency landing procedure in a scenario where a pilot is incapacitated. In some examples, the automated emergency landing procedure may be initiated by a crew member or a passenger. In some examples, an automated emergency landing procedure may cause a vehicle to autonomously perform one or more operations to land the vehicle as soon as possible. However, initiating and perform an automated emergency landing procedure may present various challenges.

BRIEF SUMMARY

In accordance with a first aspect of the disclosure, a method is provided. In some embodiments, the method is executable by one or more computing devices embodied in hardware, software, firmware, and/or any combination thereof as described herein. In some examples, the method may include generating, by one or more processors, a first emergency landing success probability value, the first emergency landing success probability value based at least in part on one or more vehicle state conditions for a vehicle; generating, by the one or more processors, a second emergency landing success probability value, the second emergency landing success probability value based at least in part on one or more environmental state conditions for an operating environment of the vehicle; and generating, by the one or more processors, a third emergency landing success probability value based at least in part on the first emergency landing success probability value and the second emergency landing success probability value.

In some examples, the first emergency landing success probability value is generated using a first machine learning model that is trained using (i) a first training dataset generated using one or more first simulations and (ii) a second training dataset comprising first historical vehicle incident data; and the second emergency landing success probability value is generated using a second machine learning model that is trained using (a) a third training dataset generated using one or more second simulations and (b) a fourth training dataset comprising second historical vehicle incident data.

In some examples, the method further includes generating, by the one or more processors, a fourth emergency landing success probability value, the fourth emergency landing success probability value based at least in part on one or more landing port conditions, wherein the third emergency landing success probability value is based at least in part on the fourth emergency landing success probability value.

In some examples, the method further includes providing, to a ground-based computing device, a recommendation for improving the fourth emergency landing success probability value, wherein the recommendation comprises an indication to clear a potential emergency landing site of one or more obstacles. In some examples, the method further includes providing, to a user interface of the vehicle, a recommendation for improving the first emergency landing success probability value.

In some examples, the method further includes generating, by the one or more processors, a fifth emergency landing success probability value, the fifth emergency landing success probability value based at least in part on one or more communication state conditions for the vehicle, wherein the third emergency landing success probability value is based at least in part on the fifth emergency landing success probability value.

In some examples, the third emergency landing success probability value is indicative of a probability that an automated emergency landing procedure will be successful. In some examples, one or more of (i) the first emergency landing success probability value, (ii) the second emergency landing success probability value, or (iii) the third emergency landing success probability value are generated periodically during a flight time period for the vehicle. In some examples, generating the third emergency landing success probability value is triggered by one or more of (i) the first emergency landing success probability value satisfying a first threshold or (ii) the second emergency landing success probability value satisfying a second threshold.

In accordance with a second aspect of the disclosure, an apparatus is provided. In one example embodiment of the apparatus, the apparatus includes one or more processors and a memory storing instructions that, when executed by the one or more processors, cause the apparatus to perform any one or more of the methods described herein. A second example apparatus includes means for performing each step of any one of the methods described herein.

In accordance with a third aspect of the disclosure, a system is provided. In one example embodiment of the system, the system includes a user interface and one or more processors in communication with the user interface, wherein the one or more processors are configured to perform any one or more of the methods described herein. In one example embodiment of the system, an example system includes at least one non-transitory computer-readable storage medium having computer program code stored thereon that, in combination with one or more processors, is configured for performing any one of the example methods described herein.

DETAILED DESCRIPTION

Figure 1:
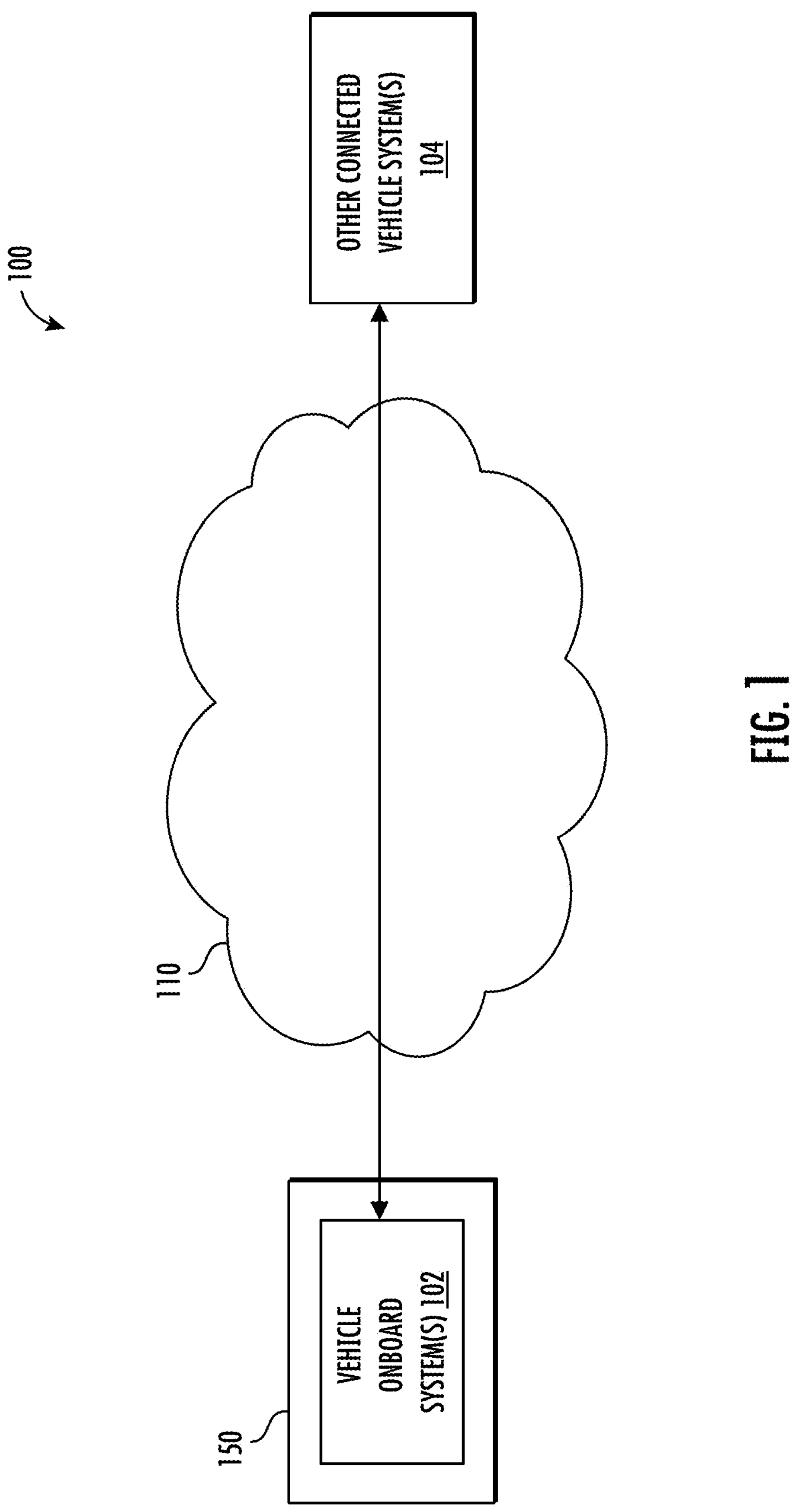
FIG. 1 illustrates a system for real-time, multi-factor prediction of emergency landing success probabilities using machine learning in accordance with one or more embodiments of the present disclosure.

Various embodiments of the present disclosure are described more fully hereinafter with reference to the accompanying drawings, in which some, but not all embodiments of the present disclosure are shown. Indeed, the present disclosure may be embodied in many different forms and should not be construed as limited to the embodiments set forth herein; rather, these embodiments are provided so that this disclosure will satisfy applicable legal requirements. The term "or" is used herein in both the alternative and conjunctive sense, unless otherwise indicated. The terms "illustrative" and "example" are used to be examples with no indication of quality level. Terms such as "computing," "determining," "generating," and/or similar words are used herein interchangeably to refer to the creation, modification, or identification of data. Further, "based on," "based at least in part on," "based at least on," "based upon," and/or similar words are used herein interchangeably in an open-ended manner such that they do not necessarily indicate being based only on or based solely on the referenced element or elements unless so indicated. Like numbers refer to like elements throughout.

Overview

In various emergency or atypical scenarios, a vehicle may perform one or more operations in the interest of passenger safety. For example, within the context of aviation, an aircraft may perform an automated emergency landing procedure in a scenario where a pilot is incapacitated. In some examples, the automated emergency landing procedure may be initiated by a crew member or a passenger. In some examples, an automated emergency landing procedure may cause a vehicle to autonomously perform one or more operations to land the vehicle as soon as possible. However, initiating and perform an automated emergency landing procedure may present various challenges.

In accordance with one or more examples described herein, improved systems and methods for real-time, multi-factor prediction of emergency landing success probabilities are provided. For example, one or more processors may generate one or more predictive insights that enable one or more individuals (e.g., air-based flight crew, ground-based flight crew, passengers, pilots) to make more informed decisions regarding whether to initiate an emergency landing procedure, such as an automated emergency landing procedure. In some examples, the one or more predictive insights may be generated using an ensemble machine learning model that includes multiple sub-models. In such examples, each sub-model (e.g., each machine learning model of the ensemble machine learning model) may be trained independently and generate respective predictive outputs that consider or otherwise account for specific factors that may influence a success likelihood for an emergency landing procedure. In some examples, an aggregate emergency landing success probability value may be generated that is based on intermediate predictive values generated by each sub-model. Accordingly, the aggregate emergency landing success probability value may provide improved predictive accuracy when compared to other predictive techniques that only consider individual factors in isolation.

As described herein, one or more individuals may receive an indication of the aggregate emergency landing success probability value and determine whether to initiate an emergency landing procedure based on the aggregate emergency landing success probability value. Such techniques may enable improved decision making and improved vehicle safety when compared to conventional techniques that include determining whether to initiate an emergency landing procedure without any insight into whether the emergency landing procedure will be successful. Additionally, or alternatively, the techniques described herein may include providing one or more recommendations to the one or more individuals for improving the emergency landing success probability, which may provide distinct improvements, such as improved vehicle safety. For example, one or more processors may cause one or more recommendations to be displayed, which may enable the one or more individuals (e.g., ground-based individuals and/or air-based individuals) to perform one or more actions to improve a success probability for an emergency landing procedure, such as performing one or more actions to improve the viability of one or more landing spots, one or more actions to improve the vehicle state (e.g., executing checklist items), performing one or more actions to avoid one or more weather scenarios, or any combination thereof.

Definitions

In some embodiments, the term "vehicle" refers to a mobile object or machine configured to travel or move from one location to another location. A vehicle may be propelled by one or more propulsions systems, such as one or more engines, one or more motors, and/or the like. In some examples, a vehicle may transport a payload including one or more objects and/or one or more individuals. A vehicle may be equipped with one or more control systems, such as a computing device, which may be configured to control the movement of the vehicle by communicating one or more control signals to one or more propulsion systems of the vehicle and/or one or more systems configured to steer, orient, or otherwise maneuver the vehicle. In some examples, a vehicle and/or a control system of a vehicle may be controlled by or may receive one or more inputs from one or more individuals, such as one or more pilots or drivers. In some other examples, a vehicle may be autonomous or unmanned. As described herein, a vehicle may be an aircraft, a spacecraft, a satellite, an automobile, a maritime vessel, an unmanned cargo vehicle utilized for package delivery, such as within a fulfilment or manufacturing system, and/or the like.

A vehicle may be equipped with one or more systems and/or devices, such as one or more computing devices (e.g., one or more client devices of a server). In some examples, a vehicle may communicate with one or more other vehicles via a wireless network. For example, a computing device of a vehicle may include communication circuitry, which may enable the vehicle to wirelessly communicate with one or more other vehicles and/or one or more other data source systems. In some examples, a vehicle may be a vertical takeoff and landing (VTOL) vehicle and/or an electric VTOL (eVTOL).

Although some examples described herein refer to a vehicle performing a landing procedure (e.g., an emergency autoland procedure), any one or more of the systems and methods described herein may be applied to the parking and/or stopping (e.g., emergency parking, emergency stopping, automatically stopping a vehicle in a safe location) of a ground-based vehicle, such as an autonomous or self-driving car. For example, one or more processors of a ground-based vehicle may generate one or more predictive insights that enable one or more individuals (e.g., a driver, a passenger, a law enforcement or public safety worker) to make a decisions regarding whether to initiate a procedure to safely stop the movement of the ground-based vehicle. In some examples, the one or more predictive insights may be generated using an ensemble machine learning model that includes multiple sub-models. In such examples, each sub-model (e.g., each machine learning model of the ensemble machine learning model) may be trained independently and generate respective predictive outputs that consider or otherwise account for specific factors that may influence a success likelihood for the procedure to safely stop the movement of the ground-based vehicle. In some examples, an aggregate success probability value (e.g., predicting a likelihood that the procedure to safely stop the movement of the ground-based vehicle will be successful) may be generated. The aggregate success probability value may be based on intermediate predictive values generated by each sub-model. Accordingly, the aggregate success probability value may provide improved predictive accuracy when compared to predictive techniques that only consider individual factors in isolation.

In some embodiments, the term "user interface" refers to hardware and/or software that is configured to interface with one or more individuals. For example, a user interface may be a device that receives one or more inputs from a user and/or provides one or more outputs to the user, such as a monitor, a display, a speaker, a microphone, a printer, a keyboard, a mouse, a joystick, and/or the like. In some examples, a user interface may be a software application, such as a graphical user interface that is displayed and/or executed on a computing device. In some examples, a user interface may provide an audio and/or visual representation of information. For example, a user interface of a vehicle, such as a display of a flight management system or any other computing device associated with a vehicle (e.g., one or more ground-based computing devices), may provide one or more indications of one or more emergency landing success probability values. Additionally, or alternatively, a user interface may provide one or more recommendations (e.g., audio or text that indicates one or more recommendations) for improving one or more emergency landing success probability values.

In some embodiments, the term "occupant of a vehicle" refers to an individual aboard a vehicle, such as a pilot, a crew member, or a passenger. In some examples, one or more occupants of a vehicle may perform one or more actions associated with one or more of the techniques described herein. For example, a pilot of an aircraft may receive a recommendation for improving one or more emergency landing success probability values via a user interface of a computing entity. In response to receiving the recommendation, the pilot may perform one or more actions to improve the one or more emergency landing success probability values. For example, the pilot may communicate with one or more ground crew members to request that one or more obstacles be cleared from a potential landing area, the pilot may modify one or more aircraft conditions (e.g., the pilot may change a flight path, change a speed of the aircraft, disable or enable one or more aircraft systems), and/or the like.

In some embodiments, the term "emergency landing success probability value" refers to a value indicative of a likelihood or probability that a vehicle will successfully complete an emergency landing procedure. In some examples, an emergency landing success probability value may be expressed as a percentage. In some other examples, an emergency landing success probability value may be expressed as a decimal value (e.g., a value between zero and one). As described herein, a successful emergency landing procedure may be defined in a variety of different ways. For example, a successful emergency landing procedure may be an emergency landing procedure that is completed without loss of life and/or without injury to any of the occupants of the vehicle.

In some examples, an emergency landing success probability value may be a predictive value, which may be generated by a predictive model, such as a machine learning model. An emergency landing success probability value may be based on one or more factors or other values. For example, a first emergency landing success probability value may be based on one or more vehicle state conditions and a second emergency landing success probability value may be based on one or more environmental state conditions for an operating environment of a vehicle. In some examples, an emergency landing success probability value may be a composite value, such as an average of two or more other values. For example, a third emergency landing success probability value may be based on the first emergency landing success probability value and the second emergency landing success probability value (e.g., the third emergency landing success probability value may be an average of two or more other emergency landing success probability values).

As described herein, an emergency landing success probability value may be indicative of a success probability for an automated emergency landing procedure (e.g., an autoland procedure). An automated emergency landing procedure may be a procedure that causes one or more systems associated with an aircraft (e.g., one or more computing devices) to autonomously control and/or land the aircraft in the event of an incapacitated or unresponsive pilot. This feature is designed to assist in situations where the pilot is unable to safely land the aircraft due to medical emergencies, incapacitation, or other critical situations. An automated emergency landing procedure may utilize one or more vehicle systems, such as autopilot systems, flight management systems, and various sensors, to guide the aircraft to a safe landing at an appropriate airport or landing site. During an automated emergency landing procedure, a vehicle may autonomously perform each aspect of a landing, including navigation, descent, approach, and touchdown, while also coordinating with air traffic control and emergency services.

In some embodiments, the term "vehicle state condition" refers to a condition, state, characteristic, or configuration associated with a vehicle, which may be utilized to generate or otherwise compute one or more emergency landing success probability values (e.g., one or more first emergency landing success probability values). A vehicle state condition may be a condition, state, characteristic, or configuration of a vehicle or of one or more vehicle systems. Some non-limiting examples of vehicle state conditions include a fuel level condition, a vehicle speed condition, a vehicle altitude condition, a vehicle payload condition, an alarm condition for any one or more vehicle systems, and/or the like. As described herein, a first machine learning model, such as a vehicle state model may generate one or more predictive outputs based on one or more vehicle state conditions.

In some embodiments, the term "environmental state condition" refers to a condition, state, characteristic, or configuration associated with an environment, such as an operating environment of a vehicle. In some examples, an environmental state condition may be utilized to generate or otherwise compute one or more emergency landing success probability values (e.g., one or more second emergency landing success probability values). Some non-limiting examples of environmental state conditions include a wind speed condition, a lightning prevalence condition, a precipitation condition, a turbulence condition, a traffic condition, a location condition, a terrain condition, and/or the like. As described herein, a second machine learning model, such as an environmental state model may generate one or more predictive outputs based on one or more environmental state conditions.

In some embodiments, the term "landing port condition" refers to a condition, state, characteristic, or configuration associated with a landing port (e.g., an airport, a vertiport, and/or the like). In some examples, a landing port condition may be utilized to generate or otherwise compute one or more emergency landing success probability values (e.g., one or more fourth emergency landing success probability values). Some non-limiting examples of landing port conditions include landing port weather conditions, landing port traffic conditions, landing port runway availability conditions, and/or the like. As described herein, a third machine learning model, such as a landing port model may generate one or more predictive outputs based on one or more landing port conditions.

In some embodiments, the term "communication state condition" refers to a condition, state, characteristic, or configuration associated with one or more communication links. For example, a communication state condition may be a condition of an air to ground communication link between an aircraft and a ground station. In some examples, a communication state condition may be utilized to generate or otherwise compute one or more emergency landing success probability values (e.g., one or more fifth emergency landing success probability values). Some non-limiting examples of communication state conditions include a communication link interface condition, a communication link throughput condition, a communication link quality condition, a communication link availability condition, and/or the like. As described herein, a fourth machine learning model, such as a communication model may generate one or more predictive outputs based on one or more communication state conditions.

In some embodiments, the term "machine learning model" refers to a model that includes parameters, hyper-parameters, and/or defined operations (e.g., including at least one of one or more rule-based layers, one or more layers that depend on trained parameters, coefficients, and/or the like). A machine learning model may be configured, trained, and/or the like to generate one or more emergency landing success probability values, as described herein. A machine learning model may be any type of machine learning model, such as a supervised, unsupervised, semi-supervised, and/or reinforcement learning models. In some embodiments, the machine learning model may include multiple models configured to perform one or more different stages of a predictive process. For example, a first stage of a predictive process may include generating a first emergency landing success probability value, a second stage of the predictive processor may include generating a second emergency landing success probability value, and so forth.

In some examples, one or more machine learning models may be utilized to generate one or more emergency landing success probability values. For example, an ensemble machine learning model may be utilized to sequentially or simultaneously generate multiple emergency landing success probability values that are then aggregated or averaged to create an aggregate or overall emergency landing success probability value (e.g., the third emergency landing success probability value). As one illustrative example, an aircraft state model (e.g., a first machine learning model) may output a first emergency landing success probability value that is based on aircraft state data, an aircraft environmental model (e.g., a second machine learning model) may output a second emergency landing success probability value that is based on aircraft environmental data, a landing ports model (e.g., a third machine learning model) may output a fourth emergency landing success probability value that is based on landing port data, and a communication link model (e.g., a fourth machine learning model) may output a fifth emergency landing success probability value that is based on communication link data. In some examples, any one or more of the machine learning models may additionally, or alternatively receive and utilize historical and/or simulation data as input data (e.g., training data). Stated another way, the one or more machine learning models may utilize any combination of real-time, historical, and/or simulation data to generate one or more emergency landing success probability values as outputs.

Such machine learning models may be trained using a regression-based, supervised training method. Each model may be trained to analyze a corresponding set of parameters (e.g., aircraft parameters, environmental parameters, airport parameters, communication parameters, and/or the like) and output a value indicative of an emergency landing success probability based on the respective set of parameters. In some examples, the value may be a value from one to nine, with a value of one corresponding to the lowest likelihood that an emergency landing will be successful and a value of 9 corresponding to the highest likelihood that an emergency landing will be successful.

In some examples, a machine learning model may be trained at regular intervals on the ground (e.g., using one or more ground-based computing devices) with real-time data recorded by one or more vehicles. The machine learning model may then be redeployed to improve the accuracy of model outputs.

The vehicle state model (e.g., the vehicle state analyzer) may be an example of a machine learning model or any other type of predictive computing component that is configured to receive one or more inputs indicative of a vehicle state (e.g., operating conditions, parameters) and generate one or more outputs indicative of one or more likelihoods that an emergency landing procedure will be successful. As described herein, the one or more outputs may be based on the one or more inputs and/or training data that is utilized to train the vehicle state model. The vehicle state model may read or otherwise receive one or more vehicle parameters (e.g., model inputs) from one or more vehicle components and/or sensors. In some examples, the one or more vehicle parameters may be received by the vehicle state model via a vehicle data network.

In some examples, the vehicle state model may perform one or more operations to determine if any one or more of the vehicle parameters satisfy one or more vehicle parameter thresholds (e.g., if any one or more of the vehicle parameters are greater than or equal to the one or more vehicle parameter thresholds). In such examples, the vehicle state model may be configured to selectively output data (e.g., to an emergency landing model) based on determining that the one or more vehicle parameters satisfy the one or more vehicle parameter thresholds.

The vehicle state model may be trained using vehicle network data that assists with the classification of anomalies based on recommended ranges given the vehicle state. The vehicle state model may be specific to or otherwise tailored to a specific type of vehicle as the sensitivity of the one or more vehicle parameters may vary according to the airframe, engine type, capacity, and the technology of the vehicle in question. In some examples, the one or more systems of the vehicle that provide input data for the vehicle state model may be pre-configured. In some other examples, the one or more systems of the vehicle that provide input data for the vehicle state model may be selected dynamically (e.g., by a computing device, by one or more individuals). For example, if an engine or a rotor is disabled (e.g., as part of a routine operation) data associated with the engine or rotor may be omitted when determining the vehicle state.

The vehicle environment model (e.g., the vehicle environment analyzer) may be an example of a machine learning model or any other type of predictive computing component that is configured to receive one or more inputs indicative of a vehicle environment (e.g., weather data, traffic data) and generate one or more outputs indicative of one or more likelihoods that an emergency landing procedure will be successful. As described herein, the one or more outputs may be based on the one or more inputs and/or training data that is utilized to train the vehicle environment model. The vehicle environment model may generate one or more outputs based on environmental conditions, such as weather within a threshold range of a current location of a vehicle. This information may be obtained from vehicle sensors and/or from one or more ground stations (e.g., via air-ground communication interfaces).

The vehicle environment model may be trained using environmental conditions encountered during flight, such as air temperature, weather, and/or turbulence at a given altitude. Additionally, or alternatively, the vehicle environment model may be trained using historical and/or recorded data, which accounts for the actions taken by the pilot and/or the successful or unsuccessful results of such actions. The vehicle environment model may be strengthened with manual and/or automated test validation. One or more onboard vehicle systems, such as a weather radar system, may assist in determining the vehicle environment. Additionally, vehicle environment data uploaded from the ground may also be used to improve the accuracy of the vehicle environment model. The set of systems (vehicle onboard systems and/or ground-based systems) utilized by the environment model may be pre-configured or may be selected based on dynamic scenarios. For example, when an air-ground communication link is not reliable, ground weather data sources may not be utilized in the computing of the vehicle environment.

The landing port model (e.g., the landing port analyzer) may be an example of a machine learning model or any other type of predictive computing component that is configured to receive one or more inputs indicative of a landing port information for a vehicle (e.g., landing port availability, distance to a landing port) and generate one or more outputs indicative of one or more likelihoods that an emergency landing procedure will be successful. As described herein, the one or more outputs may be based on the one or more inputs and/or training data that is utilized to train the landing port model. The landing port model may be configured to analyze possible landing ports based on the current location of a vehicle, a current state of the nearest landing ports, and the landing port visibility.

The potential landing ports near the current vehicle location may come from a landing port database and the current state of the landing ports may be fetched dynamically using one or more air-ground communications systems. The current state of a landing port, such as current occupancy and availability of the landing port may be utilized as inputs to the landing port model. In some examples, the landing port model may analyze visibility for one or more landing ports using one or more sensors, which may include one or more cameras, one or more radio detection and ranging (RADAR) systems, one or more light detection and ranging (LIDAR) systems, or any combination thereof.

The landing port model may be trained using a database of landing ports, which may include state information, availability information, and usability information for each landing port included in the database. Additionally, or alternatively, the landing port model may be trained using images of landing ports with various visibility levels and the altitude information for landing ports. In some examples, the landing port model may be trained using other sensor data, such as data generated by a LIDAR device for sensing the range and distance of a landing port from the current location of the vehicle. The set of systems (onboard and/or ground-based systems) utilized for assessing the landing port availability may be pre-configured or may be selected based on dynamic scenarios.

The communication model (e.g., the air-ground communication link model, the air-ground communication state analyzer) may be an example of a machine learning model or any other type of predictive computing component that is configured to receive one or more inputs indicative of communication information for a vehicle (e.g., communication link quality, communication link speed) and generate one or more outputs indicative of one or more likelihoods that an emergency landing procedure will be successful. As described herein, the one or more outputs may be based on the one or more inputs and/or training data that is utilized to train the communication model.

The communication model plays an important role in the initiation of the auto land operation once the decision to land is taken. All the independent decisions taken by the other analyzers would be continuously published to pilots, crew/passengers, and the ground station for the situational awareness. Once the decision to perform an automated emergency landing procedure is made, the actual landing process has to be initiated/triggered by one or more individuals and/or systems that control the vehicle. For example, one or more pilots, one or more ground crew members, one or more flight crew members, one or more passengers, and/or one or more computing devices may trigger the landing process. A priority order may be utilized in the decision making process for determining whether to perform an automated emergency landing procedure. For example, one or more pilots of a vehicle may be given the first priority for determining whether to perform the automated emergency landing procedure, one or more individuals at a ground station may be given the second priority for determining whether to perform the automated emergency landing procedure, and one or more crew members may be given the third priority for determining whether to perform the automated emergency landing procedure.

If the pilot can approve the decision, the automated emergency landing procedure would be initiated and the same would be conveyed to the ground control. If the pilot is incapacitated or if it as autonomous flight, the next authority to decide this would be the ground control and this requires the reliable air ground communication. In case of communication cutoff, the next approval authority is the crew. This component analyzes the current situation in the vehicle and passes on the baton to the respective HMI interface. If the pilot is not interacting with the Avionics, based on the air ground connectivity the component decides on the approval process to be taken during an emergency.

The communication model may be trained with air-ground connectivity data. The communication model may ascertain the decision-making system about the possible connectivity of the vehicle communication systems with the ground control. Each available air-ground communication link may be configured to assess the air-ground communication state or may be selected based on dynamic scenarios (e.g., when one of the communication links is disabled, it may be ignored in the computation of the air-ground communication state).

An emergency landing model (e.g., an automated emergency landing success factor analyzer) may be an example of a machine learning model or any other type of predictive computing component that is configured to receive one or more inputs indicative of one or more likelihoods that an emergency landing procedure will be successful (e.g., outputs from any one or more of the vehicle state model, the vehicle environment model, the landing port model, and the communication model) and generate one or more outputs indicative of one or more likelihoods that an emergency landing procedure will be successful (e.g., an aggregate emergency landing success probability). As described herein, the one or more outputs may be based on the one or more inputs and/or training data that is utilized to train the emergency landing model. In some examples, the emergency landing model may determine one or more actions to be taken (e.g., one or more recommendations) to increase the success factor of an emergency landing given the current flying scenario and may continuously provide a success percentage of landing at the nearby landing ports within a configured radius (e.g., a configured radius of the vehicle).

The emergency landing success probability value (e.g., the success factor, the third emergency landing success probability value) generated by the emergency landing model may provide situational awareness to a pilot to determine if an emergency landing process should be initiated to land the vehicle at a nearby landing port. If the emergency landing success probability value predicted by the emergency landing model is not favorable (e.g., does not satisfy a threshold value), then the pilot may not land the vehicle at a predetermined landing port and instead perform a forced landing below a current flying area to ensure the safety of the passengers.

Each model described herein may independently provide outputs via a respective results indicator (e.g., a dial, gauge, or any other type of indicator, which may be displayed via a user interface). Displaying results from each model may also improve situational awareness for the pilot, ground station, and crew members. In some examples, the results may be provided to the ground station and/or the flight crew, which may enable one or more individuals at a ground station and/or one or more flight crew members to select or otherwise initiate an emergency landing procedure (e.g., an automated emergency landing procedure) in a scenario where one or more pilots is incapacitated.

In some embodiments, the term "training dataset" refers to information that is utilized to train a model, such as a machine learning model. A training dataset may enable a model to determine one or more relationships between inputs and outputs. In some examples, a training dataset may include labelled or unlabeled training data. In some examples, a training dataset may include historical data and/or simulation data.

As described herein, a training dataset may include historical data relating to historical emergency landing events (e.g., historical incident data). Such a training dataset may include historical vehicle state conditions, historical environmental conditions, historical landing port conditions, historical communication conditions, or any combination thereof. Additionally, or alternatively, such a training dataset may include one or more emergency landing outcomes (e.g., indicative of whether an emergency landing was successful). Accordingly, providing a model with the training dataset may enable the model to determine one or more relationships between various conditions and emergency landing outcomes, such that the model may learn how to predict one or more emergency landing success probability values based on various input values indicative of current conditions associated with a vehicle.

In some examples, a training dataset may include simulated data in addition to, or as an alternative to historical data. The simulated data include simulated emergency landing outcomes for a variety of vehicle conditions, such as simulated vehicle state conditions, simulated environmental conditions, simulated landing port conditions, simulated communication conditions, or any combination thereof. As described herein, providing a model with the simulated data and/or the historical data may enable the model to determine one or more relationships between various conditions and emergency landing success probability values based on various input values indicative of current conditions associated with a vehicle. In some examples, each machine learning model of the ensemble machine learning model may be trained independently, using one or more respective training datasets specific to each machine learning model. For example, a vehicle state model may be trained using a first historical training dataset and/or a first simulated training dataset, a vehicle environment model may be trained using a second historical training dataset and/or a second simulated training dataset, and so forth for each model of the ensemble machine learning model.

In some embodiments, the term "recommendation" refers to a message or indication of a suggested or advised action. For example, one or more processors may provide, via one or more user interfaces, a recommendation for improving one or more emergency landing success probability values. In some examples, the recommendation may be provided to a ground-based computing device (e.g., a user interface of a ground-based computing device) and/or to a vehicle-based computing device (e.g., a user interface of a vehicle-based computing device). In such examples, the recommendation may enable or otherwise cause one or more individuals (e.g., one or more pilots, one or more ground or air crew members) to perform one or more actions, which may improve one or more emergency landing success probability values, thereby improving vehicle safety.

In some embodiments, the term "potential emergency landing site" refers to a region of a landing port (e.g., a runway at an airport) or an emergency landing region that is not associated with a landing port (e.g., a highway, a body of water, a flat region of rural land) where a vehicle may land. In some examples, the potential emergency landing site may be selected by one or more processors (e.g., based on one or more emergency landing success probability values). As described herein, an emergency landing success probability value for a potential emergency landing site may be generated or otherwise determined based on one or more landing port conditions. For example, a first vehicle may be located on a potential emergency landing site (e.g., on a runway) and one or more processors may determine one or more emergency landing success probability values for a second vehicle based on the first vehicle being located on the potential emergency landing site. In such examples, the one or more processors may provide a recommendation to one or more computing devices (e.g., a ground-based computing device at an airport, a computing device of the first vehicle) to clear the emergency landing site. For example, the recommendation may request that the first vehicle be removed from the potential emergency landing site, which, when completed, may improve the one or more emergency landing success probability values.

In some embodiments, the term "obstacle" refers to an object or obstruction that impedes or has the potential to impede the movement of a vehicle. For example, a vehicle located at a potential emergency landing site (e.g., an aircraft on a runway) may be an example of an obstacle. As described herein, some other non-limiting examples of obstacles may include buildings, terrain (e.g., trees, mountains, bodies of water), people, infrastructure (e.g., power lines, utility poles), and/or the like. In some examples, a landing port condition may include whether one or more obstacles are present or are planned to be present at a respective landing port.

In some embodiments, the term "threshold" refers to a value or limit for determining whether one or more actions and/or operations should be performed. For example, one or more processors may generate or otherwise output one or more emergency landing success probability values based on one or more thresholds being satisfied. More specifically, a third emergency landing success probability value (e.g., an aggregate probability value) may be generated if one or more emergency landing success probability values satisfy (e.g., are greater than or equal to) one or more probability value thresholds.

Example Systems and Processes of the Disclosure

FIG. 1 illustrates a system for real-time, multi-factor prediction of emergency landing success probabilities using machine learning in accordance with one or more embodiments of the present disclosure. Specifically, FIG. 1 depicts an example system 100 within which embodiments of the present disclosure may operate to perform the techniques described herein. For example, any one or more of the devices and/or systems described with reference to FIG. 1 may perform any one or more of the techniques described herein. As depicted, the system 100 includes one or more vehicle onboard systems 102, for example, which embody one or more systems of a vehicle 150. In some embodiments, the one or more vehicle onboard systems 102 are optionally communicable with one or more other computing devices and/or systems, such as one or more other connected vehicle systems 104 (e.g., one or more onboard systems of one or more other vehicles, one or more ground-based systems, one or more cloud-based systems). In some embodiments, the one or more vehicle onboard systems 102 are communicable with one or more other connected vehicle systems 104 over one or more communication networks, such as the communications network 110.

In some embodiments, the one or more vehicle onboard systems 102 include any number of computing devices, entities, and/or systems embodied in hardware, software, firmware, and/or a combination thereof that control, operate, and/or are onboard a vehicle 150. In some examples, the one or more vehicle onboard systems may include one or more physical components of the vehicle 150, including and without limitation one or more computing devices, one or more displays, one or more flight management systems, one or more engines, one or more wings, one or more props, one or more motors, one or more antennas, one or more landing gear assemblies, and/or the like. In some embodiments, the one or more vehicle onboard systems 102 include one or more sensors (e.g., one or more cameras, one or more sensors of a camera) that gather, collect, and/or otherwise aggregate flight sensor data associated with a vehicle 150 and/or an environment associated therewith.

Additionally, or alternatively, in some embodiments, the one or more vehicle onboard systems 102 include one or more computing devices and/or systems embodied in hardware, software, firmware, and/or a combination thereof, that control operation of one or more physical components of the vehicle 150, including and without limitation, one or more displays, one or more flight management systems, one or more engines, one or more wings, one or more props, one or more landing gear assemblies, one or more sensors, and/or the like. Additionally, or alternatively, in some embodiments, the one or more vehicle onboard systems 102 include one or more computing devices and/or systems that generate one or more user interfaces capable of being rendered to one or more displays of the one or more vehicle onboard systems 102. Additionally, or alternatively, in some embodiments, the one or more vehicle onboard systems 102 include one or more computing devices and/or systems that generates and/or maintains data embodying and/or utilized to recreate a virtual environment including virtual aspects corresponding to and/or associated with a real-world environment and/or a virtual vehicle corresponding to the actual vehicle. It will be appreciated that the vehicle 150 may include any number of physical components that enable the vehicle 150 to operate in a particular manner of airborne, space, aquatic, and/or ground-based travel.

In some embodiments, the one or more vehicle onboard systems 102 include one or more personal computers, one or more end-user terminals, one or more monitors, and/or one or more displays. Additionally, or alternatively, in some embodiments, the one or more vehicle onboard systems 102 include one or more data repositories embodied in hardware, software, firmware, and/or any combination thereof to support functionality provided by one or more computing devices of the one or more vehicle onboard systems 102. In some embodiments the one or more vehicle onboard systems 102 include one or more specially configured integrated systems that process data received by and/or controlled by one or more other computing devices and/or systems of the one or more vehicle onboard systems 102.

The one or more other connected vehicle systems 104 may include one or more computing devices, systems, and/or onboard systems of one or more other vehicles in communication with the vehicle 150. It will be appreciated that the one or more other connected vehicle systems 104 in some embodiments include one or more computing devices and/or one or more systems of one or more other vehicles of the same type operating within the same environment as the vehicle 150. For example, in some embodiments some of the other connected vehicle systems 104 include one or more computing devices and/or systems of one or more other vehicles in a fleet of a particular type of vehicle. Additionally, or alternatively, in some embodiments, the one or more other connected vehicle systems 104 include one or more computing devices and/or systems of one or more ground-based vehicles, one or more other types of vehicles, and/or the like.

In some embodiments, the one or more vehicle onboard systems 102 receive data from one or more of the other connected vehicle systems 104 that provides additional context with respect to the environment in which the vehicle 150 is operating. For example, in some embodiments, the one or more vehicle onboard systems 102 communicate with one or more other connected vehicle systems 104 to determine a position of one or more other vehicles, objects, environmental features (e.g., buildings, terrain, and/or the like) within the environment of the vehicle 150. Additionally, or alternatively, in some embodiments, the one or more vehicle onboard systems 102 communicate with one or more of the other connected vehicle systems 104 to receive flight sensor data of a particular data type that is not capturable directly by the one or more vehicle onboard systems 102. For example, in some embodiments, the vehicle 150 does not include a particular sensor for capturing a particular type of data, and instead receives such data of the particular data type from the one or more other connected vehicle systems 104.

In some embodiments, the one or more vehicle onboard systems 102 may include one or more flight management systems, which may themselves include one or more computing devices embodied in hardware, software, firmware, and/or the like that generate, assign, and/or maintain flight plan information and/or other flight detail data for the vehicle 150 and/or one or more other vehicles. For example, in some embodiments, the one or more flight management systems include one or more computing devices and/or systems of an air traffic control (ATC) system and/or other authoritative entity that assigns flight detail data (e.g., one or more particular flight plans and/or information associated therewith, one or more transportation corridors) to one or more vehicles 150. Such information may include, without limitation, flight detail data embodying a visual flight rules (VFR) flight plan, an instrument flight rules (IFR) flight plan, a composite flight plan, and/or the like defining conditions for operating a vehicle 150 within a particular environment.

In some embodiments, the one or more flight management systems include one or more application servers, one or more end user terminals, one or more personal computers, one or more mobile devices, one or more user devices, and/or the like that generate, assign, and/or transmit flight detail data to one or more vehicles 150. Additionally, or alternatively, in some embodiments, the one or more flight management systems may include one or more data repositories embodied in hardware, software, firmware, and/or a combination thereof, that store flight detail data, links between flight detail data and one or more vehicles 150, and/or the like. Additionally, or alternatively, in some embodiments, the one or more flight management systems include one or more computing devices and/or systems that detect and/or monitor operation of one or more vehicles 150 within an environment. For example, in some embodiments, the one or more flight management systems include one or more radar systems that monitor the position of one or more vehicles 150 within a particular portion of an environment.

In some embodiments, the one or more other connected vehicle systems 104 may be examples of systems and/or devices capable of communicating or otherwise sharing data with the one or more vehicle onboard systems 102. The one or more other connected vehicle systems 104 may be ground-based or air-based. In some examples, the one or more other connected vehicle systems 104 may generate data. That is, data may originate from the one or more other connected vehicle systems 104. Additionally, or alternatively, the one or more other connected vehicle systems 104 may receive data that originates from one or more other sources and communicate or otherwise relay the data to one or more devices. The one or more other connected vehicle systems 104 may include one or more data storage systems, such as volatile or non-volatile memory devices. Some illustrative examples of one or more other connected vehicle systems 104 may include other vehicles, weather monitoring systems, ATC systems, and/or the like.

The one or more other connected vehicle systems 104 may include one or more computing devices and/or systems that store and/or generate data. In some examples, the data may represent one or more aspects of a real-world environment, object therein, and/or vehicle 150 therein. In some embodiments, the one or more other connected vehicle systems 104 include one or more data repositories that store data embodying terrain of a particular environment. Additionally, or alternatively, in some embodiments, the one or more other connected vehicle systems 104 include one or more data repositories that store data embodying one or more buildings, one or more objects and/or one or more other features within the environment that one or more vehicles 150 in the environment is to avoid or interact with (e.g., for takeoff and/or landing). In some embodiments, the one or more other connected vehicle systems 104 embody a subsystem of the one or more flight management systems and/or the one or more vehicle onboard systems 102. In some embodiments, the one or more other connected vehicle systems 104 include a cityscape obstacle database, a vertiport database (e.g., including locations, dimensions, and/or other characteristic of one or more landing zones), and/or the like.

In some embodiments, the one or more other connected vehicle systems 104 include one or more application servers, one or more end user terminals, one or more personal computers, one or more mobile devices, one or more user devices, and/or the like. Additionally, or alternatively, in some embodiments, the one or more other connected vehicle systems 104 include one or more database server specially configured to store data pushed from one or more other computing devices and/or systems (e.g., the one or more vehicle onboard systems 102, one or more flight management systems, and/or the like) and/or retrieve data in response to one or more queries from one or more other computing devices and/or systems. In some embodiments, the one or more other connected vehicle systems 104 include one or more remote and/or cloud computing devices accessible to the one or more vehicle onboard systems 102 and/or one or more flight management systems over a communications network, such as the communications network 110.

In some embodiments the communications network 110 enables communication between the various computing devices and/or systems utilizing one or more combinations of wireless and/or wired data transmissions and protocols. In this regard, the communications network 110 may embody any of a myriad of network configurations. In some embodiments, the communications network 110 embodies a public network (e.g., the internet) in whole or in part. In some embodiments, the communications network 110 embodies a private network (e.g., an internal network between particular computing devices) in whole or in part. Additionally, or alternatively, in some embodiments the communications network 110 embodies a direct or private connection facilitated over satellite and/or radio systems that enable long-range communication between the vehicle 150 and corresponding grounded systems. In some other embodiments, the communications network 110 embodies a hybrid network (e.g., a network enabling internal communications between connected computing devices and external communications with other computing devices).

The communications network 110 may include one or more base stations, one or more relays, one or more routers, one or more switches, one or more cell towers, one or more communications cables, one or more satellites, one or more radio antennas, and/or one or more related control systems and/or associated routing stations. In some embodiments, the communications network 110 includes one or more user entity-controlled computing devices and/or other enterprise devices (e.g., an end-user or enterprise router, modem, switch, and/or other network access point) and/or one or more external utility devices (e.g., one or more internet service provider communication towers, one or more cell towers, and/or one or more other devices).

Figure 2:
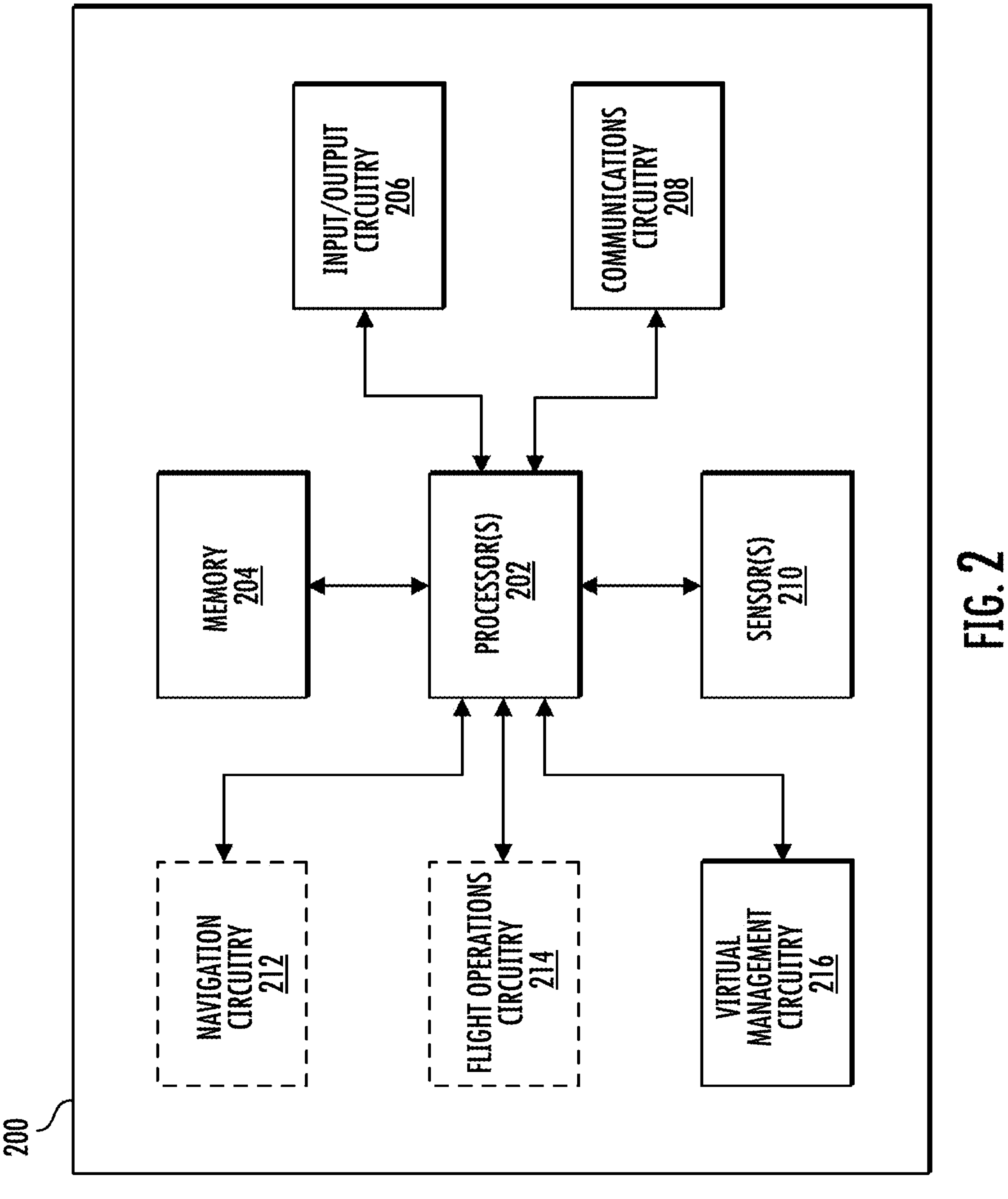
FIG. 2 illustrates a block diagram of a computing device for real-time, multi-factor prediction of emergency landing success probabilities using machine learning in accordance with one or more embodiments of the present disclosure.

FIG. 2 illustrates a block diagram of a computing device for real-time, multi-factor prediction of emergency landing success probabilities using machine learning in accordance with one or more embodiments of the present disclosure. Specifically, FIG. 2 depicts a computing device 200. In some embodiments, the one or more vehicle onboard systems 102 and/or the one or more other connected vehicle systems 104 described with reference to FIG. 1 may include one or more computing devices 200. As depicted, the computing device 200 includes one or more processors 202, one or more memories 204, input/output circuitry 206, communications circuitry 208, one or more sensors 210, navigation circuitry 212, flight operations circuitry 214, and/or virtual management circuitry 216, any of which may perform any one or more operations as described herein. In some such embodiments, the navigation circuitry 212 and/or the flight operations circuitry 214 is/are optional.

In some embodiments, the computing device 200 is configured, using one or more of the sets of circuitry embodying the processor 202, the memory 204, the input/output circuitry 206, the communications circuitry 208, the one or more sensors 210, the navigation circuitry 212, the flight operations circuitry 214, and/or the virtual management circuitry 216, to execute any one or more of the operations described herein. Although components are described with respect to functional limitations, the particular implementations may include the user of the particular computing hardware, who may provide inputs to and/or receive outputs from the computing device 200 via the input/output circuitry 206. It should also be understood that in some embodiments certain components described herein include similar or common hardware. For example, two sets of circuitry may both leverage use of the same processor 202, network interface, storage medium, and/or the like, to perform their associated functions, such that duplicate hardware is not required for each set of circuitry. The use of the term "circuitry" as used herein with respect to components of the apparatuses described herein should therefore be understood to include particular hardware configured to perform the functions associated with the particular circuitry as described herein.

Particularly, the term "circuitry" should be understood broadly to include hardware and, in some embodiments, software for configuring the hardware. For example, in some embodiments, "circuitry" includes processing circuitry, storage media, network interfaces, input/output devices, and/or the like. Additionally, or alternatively, in some embodiments, other elements of the computing device 200 provide or supplement the functionality of another particular set of circuitry. For example, the processor 202 in some embodiments provides processing functionality to any of the other sets of circuitry, the memory 204 provides storage functionality to any of other the sets of circuitry, the communications circuitry 208 provides network interface functionality to any of the other sets of circuitry, and/or the like.

In some embodiments, the processor 202 (and/or co-processor or any other processing circuitry assisting or otherwise associated with the processor) is/are in communication with the memory 204 via a bus for passing information among components of the computing device 200. In some embodiments, for example, the memory 204 is non-transitory and includes, for example, one or more volatile and/or non-volatile memories. In other words, for example, the memory 204 may include or embody an electronic storage device (e.g., a computer readable storage medium). In some embodiments, the memory 204 is configured to store information, data, content, applications, instructions, or the like, for enabling the computing device 200 to carry out various functions in accordance with example embodiments of the present disclosure.

In various embodiments, the processor 202 is embodied in a number of different ways. For example, in some example embodiments, the processor 202 includes one or more processing devices configured to operate independently. Additionally, or alternatively, in some embodiments, the processor 202 includes a processor configured in tandem via a bus to enable independent execution of instructions, pipelining, and/or multithreading. The use of the terms "processor" and "processing circuitry" should be understood to include a single core processor, a multi-core processor, multiple processors internal to the computing device 200, and/or one or more remote or cloud-based processors external to the computing device 200.

In an example embodiment, the processor 202 is configured to execute instructions stored in the memory 204 or otherwise accessible to the processor 202. Additionally, or alternatively, the processor 202 may be configured to execute hard-coded functionality. As such, whether configured by hardware or software methods, or by a combination thereof, the processor 202 represents an entity (e.g., physically embodied in circuitry) capable of performing operations according to an embodiment of the present disclosure while configured accordingly. Additionally, or alternatively, as another example, when the processor 202 is embodied as an executor of software instructions, the instructions specifically configure the processor 202 to perform the algorithms embodied in the specific operations described herein when such instructions are executed.

In some embodiments, computing device 200 includes input/output circuitry 206 and/or communications circuitry 208 that provides output to a user and/or receives input from a user. In some embodiments, the input/output circuitry 206 and/or the communications circuitry 208 is/are in communication with the processor 202 to provide such functionality. The input/output circuitry 206 may comprise one or more user interfaces and in some embodiments includes one or more displays that comprise the one or more interfaces rendered as a web user interface, an application user interface, a user device, a backend system, or the like. In some embodiments, the input/output circuitry 206 also includes a keyboard, a mouse, a joystick, a touch screen, touch areas, soft keys, a microphone, a speaker, or other input/output mechanisms. The processor 202, and/or input/output circuitry 206 comprising a processor, in some embodiments is configured to control one or more functions of one or more user interface elements through computer program instructions (e.g., software and/or firmware) stored on a memory accessible to the processor 202 (e.g., memory 204, and/or the like). In some embodiments, the input/output circuitry 206 includes or utilizes a user-facing application to provide input/output functionality to a service maintainer device and/or other display associated with a user.

The communications circuitry 208 includes any means such as a device or circuitry embodied in either hardware or a combination of hardware and software that is configured to receive and/or transmit data from/to a communications network and/or any other computing device, circuitry, or module in communication with the computing device 200. In this regard, the communications circuitry 208 includes, for example in some embodiments, a network interface for enabling communications with a wired or wireless communications network. Additionally, or alternatively in some embodiments, the communications circuitry 208 includes one or more network interface cards, one or more antennas, one or more busses, one or more switches, one or more routers, one or more modems, and supporting hardware, firmware, and/or software, or any other device suitable for enabling communications via one or more communication networks. Additionally, or alternatively, the communications circuitry 208 includes circuitry for interacting with the one or more antennas and/or other hardware or software to cause transmission of signals via the one or more antennas or to handle receipt of signals received via the one or more antennas. In some embodiments, the communications circuitry 208 enables transmission to and/or receipt of data from one or more computing devices and/or systems of one or more other connected vehicle systems 104 and/or one or more flight management systems in communication with the computing device 200.

The one or more sensors 210 include hardware, software, firmware, and/or a combination thereof, that supports generation, capturing, aggregating, retrieval, and/or receiving of one or more portions of data, such as flight sensor data and/or image data. In some embodiments, the one or more sensors 210 include one or more components of a vehicle. The one or more sensors 210 in some embodiments are affixed to, within, and/or otherwise a part of a vehicle including or otherwise associated with the computing device 200. For example, in some embodiments, one or more of the sensors 210 are mounted to the vehicle. Non-limiting examples of sensors 210 include altimeters (e.g., radio and/or barometric), pressure sensors, pitot tubes, anemometers, image cameras, video cameras, infrared sensors, and/or the like. Additionally, or alternatively, in some embodiments, the one or more sensors 210 include one or more communication systems that enable aggregation of one or more portions of flight sensor data from one or more external computing devices and/or systems communicable with the computing device 200, for example one or more other connected vehicle systems 104 and/or one or more flight management systems. In some embodiments, the one or more sensors 210 include any of a myriad of sensors conventionally associated with drones, helicopters, and/or other urban air mobility vehicles. Additionally, or alternatively, in some embodiments, the one or more sensors 210 include one or more high-sensitivity sensors to facilitate and/or enable high accuracy capturing of data in certain circumstances. For example, in some embodiments, the one or more sensors 210 include one or more high-sensitivity altimeters that capture detailed altitude information within a few feet (e.g., within tens of feet) from a landing zone. In this regard, such high-sensitivity sensors in some embodiments provide higher-accuracy data when a vehicle is close to a landing zone, where such higher-accuracy data is utilized in depicting accurate positioning of a virtual vehicle corresponding to the vehicle within a virtual environment with respect to a virtual representation of the landing zone and/or a virtual corridor.

In some embodiments, the one or more sensors 210 include hardware, software, firmware, and/or a combination thereof, embodying one or more navigation sensors. In some embodiments, the one or more navigation sensors include a global positioning satellite (GPS) tracking chip and/or the like enabling location services to be requested and/or determined for a particular vehicle. Additionally, or alternatively, in some embodiments, the one or more sensors 210 include hardware, software, firmware, and/or any combination thereof, embodying one or more inertial navigation sensors that measure speed, acceleration, orientation, and/or position-related data in a 3D environment. Additionally, or alternatively, in some embodiments, the one or more sensors 210 include one or more cameras associated with a synthetic vision system (SVS). In some such embodiments, such an SVS camera captures image data representations of the real-world environment around a vehicle for use in generating one or more corresponding user interface depicting the captured image data, augmenting such image data, and/or otherwise providing data to enable an operator to acquire situational awareness based at least in part on the captured image data. It will be appreciated that, in some embodiments, the one or more sensors 210 include a separate processor, specially configured field programmable gate array (FPGA), or a specially programmed application specific integrated circuit (ASIC).

The navigation circuitry 212, which may optionally be included, includes hardware, software, firmware, and/or a combination thereof, that supports various functionality associated with navigating a vehicle. In some embodiments, navigation circuitry 212 includes hardware, software, firmware, and/or a combination thereof, that receives flight plan data, location service data representing a location of the vehicle, and/or the like. Additionally, or alternatively, in some embodiments, the navigation circuitry 212 includes hardware, software, firmware, and/or a combination thereof, that determines a location of a landing zone from which a vehicle is taking off and/or where a vehicle is landing. Additionally, or alternatively, in some embodiments, the navigation circuitry 212 includes hardware, software, firmware, and/or a combination thereof, that determines a location along a flight path at which a vehicle is to switch operational mode (e.g., to initiate change to and/or from a vertical landing mode and/or vertical takeoff mode). It will be appreciated that, in some embodiments, navigation circuitry 212 includes a separate processor, specially configured FPGA, or a specially programmed ASIC.

The flight operations circuitry 214, which may optionally be included, includes hardware, software, firmware, and/or a combination thereof, that supports various functionality associated with controlling a vehicle. In some embodiments, the flight operations circuitry 214 includes hardware, software, firmware, and/or a combination thereof, that autonomously control one or more components of a vehicle to facilitate movement of the vehicle along a particular flight path. Additionally, or alternatively, in some embodiments, the flight operations circuitry 214 includes hardware, software, firmware, and/or a combination thereof, that semi-autonomously control one or more components of a vehicle, for example where certain aspects of the operation of the vehicle are autonomously performed and others (e.g., directional control) is/are controlled by a user (e.g., a pilot). Additionally, or alternatively, in some embodiments, the flight operations circuitry 214 includes hardware, software, firmware, and/or a combination thereof, that receives pilot input for controlling one or more components of a vehicle, for example via vehicle flight controls to alter speed and/or direction of the vehicle. Additionally, or alternatively, in some embodiments, the flight operations circuitry 214 includes hardware, software, firmware, and/or a combination thereof, that causes changes to an operational mode of a vehicle, for example autonomously based at least in part on one or more data-driven events and/or triggers, or in response to user input initiating the change in operational mode. It will be appreciated that, in some embodiments, the flight operations circuitry 214 includes a separate processor, specially configured FPGA, or a specially programmed ASIC.

The virtual management circuitry 216 includes hardware, software, firmware, and/or a combination thereof, that supports various functionality associated with generating and/or maintaining one or more virtual elements and/or outputting one or more urban air mobility (UAM) visualization interfaces embodying one or more views of one or more virtual elements. In some embodiments, the virtual management circuitry 216 includes hardware, software, firmware, and/or a combination thereof, that generates a virtual environment based at least in part on flight sensor data. Additionally, or alternatively, in some embodiments, the virtual management circuitry 216 includes hardware, software, firmware, and/or a combination thereof, that generates a virtual vehicle based at least in part on flight sensor data, the virtual vehicle corresponding to a vehicle in a real-world environment. Additionally, or alternatively, in some embodiments, the virtual management circuitry 216 includes hardware, software, firmware, and/or a combination thereof, that generates a virtual corridor based at least in part on flight sensor data. Additionally, or alternatively, in some embodiments, the virtual management circuitry 216 includes hardware, software, firmware, and/or a combination thereof, that maintains one or more virtual elements (e.g., a virtual environment, virtual vehicle, virtual corridor, and/or the like) as new data is received. For example, in some embodiments, the virtual management circuitry 216 updates a speed, direction, velocity, altitude, and/or other data value associated with a virtual vehicle in a virtual environment as updated flight sensor data associated with a corresponding vehicle is received. Additionally, or alternatively, in some embodiments, the virtual management circuitry 216 includes hardware, software, firmware, and/or a combination thereof, that outputs data embodying a UAM visualization interface from a particular view with respect to the virtual vehicle, for example a profile view, an exocentric view, and/or an egocentric view.

In some embodiments, the virtual management circuitry 216 includes hardware, software, firmware, and/or any combination thereof, that generates one or more user interface elements and/or otherwise causes rendering of one or more user interfaces including one or more specially configured user interface elements. For example, in some embodiments, the virtual management circuitry 216 includes hardware, software, firmware, and/or a combination thereof that generates one or more virtual elements to be depicted via a UAM visualization interface. For example, in some embodiments, the virtual management circuitry 216 generates a UAM visualization interface depicting a virtual corridor, with or without reliance on maintaining a virtual environment. In some embodiments, the virtual management circuitry 216 includes a graphics processor that generates one or more specially configured virtual user interface elements (e.g., a representation of a virtual corridor) based at least in part on flight sensor data, and/or generating sub-interfaces including some or all of such virtual user interface elements and/or other interface elements. Additionally, or alternatively, in some embodiments, the virtual management circuitry 216 includes one or more displays embodied in hardware, software, firmware, and/or a combination thereof, that render one or more user interfaces and/or elements thereof. It will be appreciated that, in some embodiments, virtual management circuitry 216 includes a separate processor, specially configured FPGA, or a specially programmed ASIC.

It will be appreciated that, in some embodiments, two or more of the sets of circuitries 202-216 are combinable. Additionally, or alternatively, in some embodiments, one or more of the sets of circuitry 202-216 perform some or all of the functionality described associated with another component. For example, in some embodiments, one or more of the sets of circuitry 202-216 are combined into a single component embodied in hardware, software, firmware, and/or a combination thereof. For example, in some embodiments, two or more of the navigation circuitry 212, flight operations circuitry 214, and/or virtual management circuitry 216 are embodied by a single set of circuitry that performs the combined operations of the individual sets of circuitry. Similarly, in some embodiments, one or more of the sets of circuitry, for example navigation circuitry 212, flight operations circuitry 214, and/or virtual management circuitry 216, is/are combined with the processor 202, such that the processor 202 performs one or more of the operations described above with respect to each of these other sets of circuitry.

Figure 3:
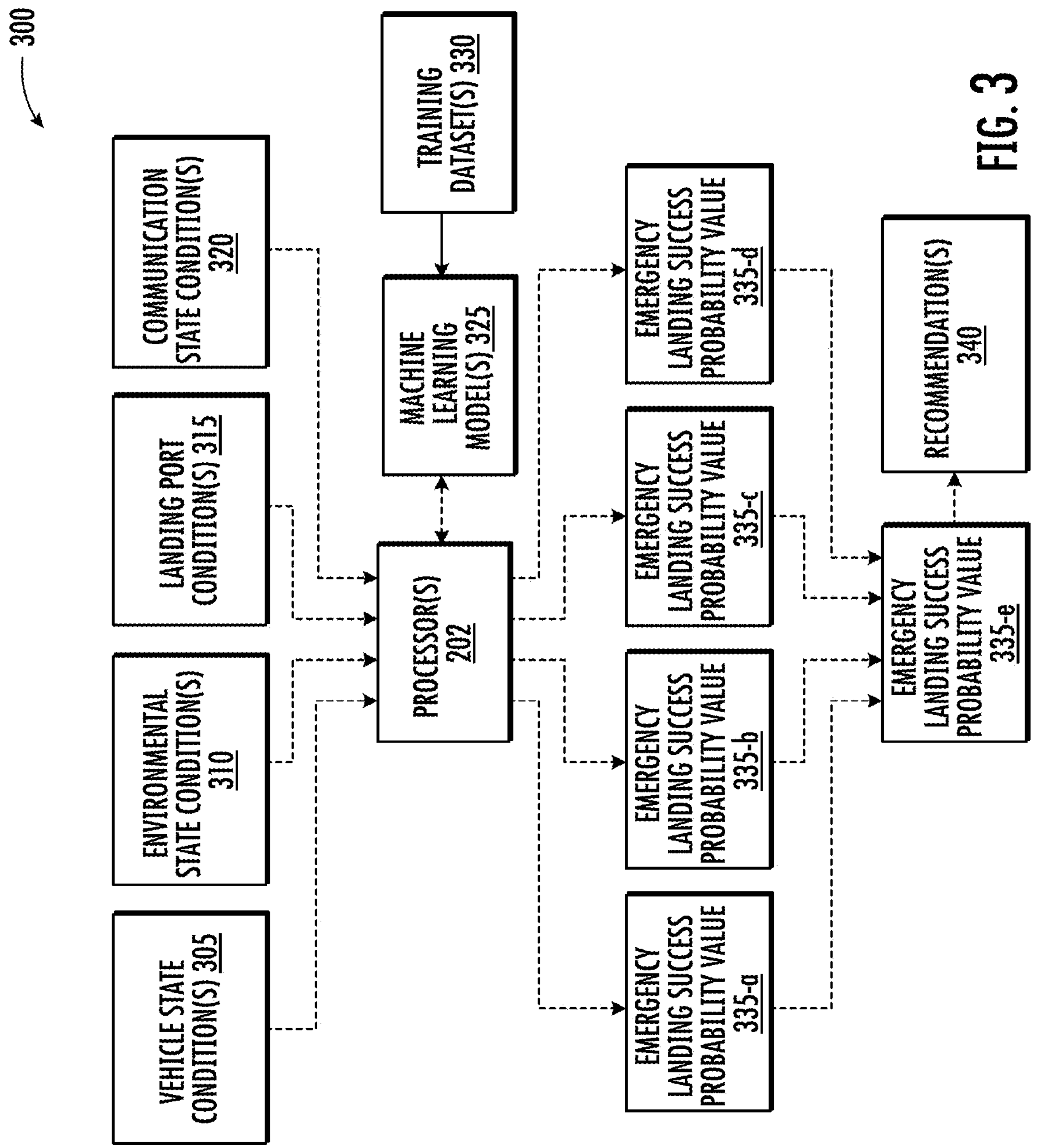
FIG. 3 is a dataflow diagram showing example data structures and modules for real-time, multi-factor prediction of emergency landing success probabilities using machine learning in accordance with one or more embodiments of the present disclosure.

FIG. 3 is a dataflow diagram 300 showing example data structures and modules for real-time, multi-factor prediction of emergency landing success probabilities using machine learning in accordance with one or more embodiments of the present disclosure. In some examples, one or more processors 202 (e.g., of a vehicle) may generate an emergency landing success probability value 335-*a*. The emergency landing success probability value 335-*a* may be based on one or more vehicle state conditions 305 for a vehicle.

In some embodiments, a vehicle may be a mobile object or machine configured to travel or move from one location to another location. A vehicle may be propelled by one or more propulsions systems, such as one or more engines, one or more motors, and/or the like. In some examples, a vehicle may transport a payload including one or more objects and/or one or more individuals. A vehicle may be equipped with one or more control systems, such as a computing device, which may be configured to control the movement of the vehicle by communicating one or more control signals to one or more propulsion systems of the vehicle and/or one or more systems configured to steer, orient, or otherwise maneuver the vehicle. In some examples, a vehicle and/or a control system of a vehicle may be controlled by or may receive one or more inputs from one or more individuals, such as one or more pilots or drivers. In some other examples, a vehicle may be autonomous or unmanned. As described herein, a vehicle may be an aircraft, a spacecraft, a satellite, an automobile, a maritime vessel, an unmanned cargo vehicle utilized for package delivery, such as within a fulfilment or manufacturing system, and/or the like.

A vehicle may be equipped with one or more systems and/or devices, such as one or more computing devices (e.g., one or more client devices of a server). In some examples, a vehicle may communicate with one or more other vehicles via a wireless network. For example, a computing device of a vehicle may include communication circuitry, which may enable the vehicle to wirelessly communicate with one or more other vehicles and/or one or more other data source systems. In some examples, a vehicle may be a vertical takeoff and landing (VTOL) vehicle and/or an electric VTOL (eVTOL).

In some embodiments, an emergency landing success probability value 335 may be a value indicative of a likelihood or probability that a vehicle will successfully complete an emergency landing procedure. In some examples, an emergency landing success probability value 335 may be expressed as a percentage. In some other examples, an emergency landing success probability value 335 may be expressed as a decimal value (e.g., a value between zero and one). As described herein, a successful emergency landing procedure may be defined in a variety of different ways. For example, a successful emergency landing procedure may be an emergency landing procedure that is completed without loss of life and/or without injury to any of the occupants of the vehicle.

In some examples, an emergency landing success probability value 335 may be a predictive value, which may be generated by a predictive model, such as a machine learning model 325. An emergency landing success probability value 335 may be based on one or more factors or other values. For example, an emergency landing success probability value 335-*a* may be based on one or more vehicle state conditions 305 and an emergency landing success probability value 335-*b* may be based on one or more environmental state conditions 310 for an operating environment of a vehicle. In some examples, an emergency landing success probability value 335-*e* may be a composite value, such as an average of two or more other values. For example, an emergency landing success probability value 335-*e* may be based on the emergency landing success probability value 335-*a* and the emergency landing success probability value 335-*b* (e.g., the emergency landing success probability value 335-*e* may be an average of two or more other emergency landing success probability values 335).

As described herein, an emergency landing success probability value 335 may be indicative of a success probability for an automated emergency landing procedure (e.g., an autoland procedure). An automated emergency landing procedure may be a procedure that causes one or more systems associated with an aircraft (e.g., one or more computing devices) to autonomously control and/or land the aircraft in the event of an incapacitated or unresponsive pilot. This feature is designed to assist in situations where the pilot is unable to safely land the aircraft due to medical emergencies, incapacitation, or other critical situations. An automated emergency landing procedure may utilize one or more vehicle systems, such as autopilot systems, flight management systems, and various sensors, to guide the aircraft to a safe landing at an appropriate airport or landing site. During an automated emergency landing procedure, a vehicle may autonomously perform each aspect of a landing, including navigation, descent, approach, and touchdown, while also coordinating with air traffic control and emergency services.

In some embodiments, a vehicle state condition 305 may be a condition, state, characteristic, or configuration associated with a vehicle, which may be utilized to generate or otherwise compute one or more emergency landing success probability values 335 (e.g., one or more emergency landing success probability values 335-*a*). A vehicle state condition 305 may be a condition, state, characteristic, or configuration of a vehicle or of one or more vehicle systems. Some non-limiting examples of vehicle state conditions 305 include a fuel level condition, a vehicle speed condition, a vehicle altitude condition, a vehicle payload condition, an alarm condition for any one or more vehicle systems, and/or the like. As described herein, a first machine learning model 325, such as a vehicle state model may generate one or more predictive outputs based on one or more vehicle state conditions 305.

In some examples, the one or more processors 202 may generate an emergency landing success probability value 335-*b*. The emergency landing success probability value 335-*b* may be based on one or more environmental state conditions 310 for an operating environment of the vehicle. In some embodiments, an environmental state condition 310 may be a condition, state, characteristic, or configuration associated with an environment, such as an operating environment of a vehicle. In some examples, an environmental state condition 310 may be utilized to generate or otherwise compute one or more emergency landing success probability values 335 (e.g., one or more emergency landing success probability values 335-*b*). Some non-limiting examples of environmental state conditions 310 include a wind speed condition, a lightning prevalence condition, a precipitation condition, a turbulence condition, a traffic condition, a location condition, a terrain condition, and/or the like. As described herein, a second machine learning model 325, such as an environmental state model may generate one or more predictive outputs based on one or more environmental state conditions 310. In some examples, the one or more processors 202 may generate an emergency landing success probability value 335-*e* based on the emergency landing success probability value 335-*a* and the emergency landing success probability value 335-*b*.

In some examples, the emergency landing success probability value 335-*a* is generated using a first machine learning model 325 that is trained using a first training dataset 330 generated using one or more first simulations and a second training dataset 330 including first historical vehicle incident data. In some examples, the emergency landing success probability value 335-*b* is generated using a second machine learning model 325 that is trained using a third training dataset 330 generated using one or more second simulations and a fourth training dataset 330 including second historical vehicle incident data.

In some embodiments, a machine learning model 325 may be a model that includes parameters, hyper-parameters, and/or defined operations (e.g., including at least one of one or more rule-based layers, one or more layers that depend on trained parameters, coefficients, and/or the like). A machine learning model 325 may be configured, trained, and/or the like to generate one or more emergency landing success probability values 335, as described herein. A machine learning model 325 may be any type of machine learning model 325, such as a supervised, unsupervised, semi-supervised, and/or reinforcement learning models. In some embodiments, the machine learning model 325 may include multiple models configured to perform one or more different stages of a predictive process. For example, a first stage of a predictive process may include generating an emergency landing success probability value 335-*a*, a second stage of the predictive processor may include generating an emergency landing success probability value 335-*b*, and so forth.

In some examples, one or more machine learning models 325 may be utilized to generate one or more emergency landing success probability values 335. For example, an ensemble machine learning model 325 may be utilized to sequentially or simultaneously generate multiple emergency landing success probability values 335 that are then aggregated or averaged to create an aggregate or overall emergency landing success probability value 335 (e.g., the emergency landing success probability value 335-*e*). As one illustrative example, an aircraft state model (e.g., a first machine learning model 325) may output an emergency landing success probability value 335-*a* that is based on aircraft state data, an aircraft environmental model (e.g., a second machine learning model 325) may output an emergency landing success probability value 335-*b* that is based on aircraft environmental data, a landing ports model (e.g., a third machine learning model 325) may output an emergency landing success probability value 335-*c* that is based on landing port data, and a communication link model (e.g., a fourth machine learning model 325) may output an emergency landing success probability value 335-*d* that is based on communication link data. In some examples, any one or more of the machine learning models 325 may additionally, or alternatively receive and utilize historical and/or simulation data as input data (e.g., training data). Stated another way, the one or more machine learning models 325 may utilize any combination of real-time, historical, and/or simulation data to generate one or more emergency landing success probability values 335 as outputs.

Such machine learning models 325 may be trained using a regression-based, supervised training method. Each model may be trained to analyze a corresponding set of parameters (e.g., aircraft parameters, environmental parameters, airport parameters, communication parameters, and/or the like) and output a value indicative of an emergency landing success probability based on the respective set of parameters. In some examples, the value may be a value from one to nine, with a value of one corresponding to the lowest likelihood that an emergency landing will be successful and a value of 9 corresponding to the highest likelihood that an emergency landing will be successful.

In some examples, a machine learning model 325 may be trained at regular intervals on the ground (e.g., using one or more ground-based computing devices) with real-time data recorded by one or more vehicles. The machine learning model 325 may then be redeployed to improve the accuracy of model outputs.

The vehicle state model (e.g., the vehicle state analyzer) may be an example of a machine learning model 325 or any other type of predictive computing component that is configured to receive one or more inputs indicative of a vehicle state (e.g., operating conditions, parameters) and generate one or more outputs indicative of one or more likelihoods that an emergency landing procedure will be successful. As described herein, the one or more outputs may be based on the one or more inputs and/or training data that is utilized to train the vehicle state model. The vehicle state model may read or otherwise receive one or more vehicle parameters (e.g., model inputs) from one or more vehicle components and/or sensors. In some examples, the one or more vehicle parameters may be received by the vehicle state model via a vehicle data network.

In some examples, the vehicle state model may perform one or more operations to determine if any one or more of the vehicle parameters satisfy one or more vehicle parameter thresholds (e.g., if any one or more of the vehicle parameters are greater than or equal to the one or more vehicle parameter thresholds). In such examples, the vehicle state model may be configured to selectively output data (e.g., to an emergency landing model) based on determining that the one or more vehicle parameters satisfy the one or more vehicle parameter thresholds. In some examples, The vehicle state model may be trained using vehicle network data that assists with the classification of anomalies based on recommended ranges given the vehicle state. The vehicle state model may be specific to or otherwise tailored to a specific type of vehicle as the sensitivity of the one or more vehicle parameters may vary according to the airframe, engine type, capacity, and the technology of the vehicle in question. In some examples, the one or more systems of the vehicle that provide input data for the vehicle state model may be pre-configured. In some other examples, the one or more systems of the vehicle that provide input data for the vehicle state model may be selected dynamically (e.g., by a computing device, by one or more individuals). For example, if an engine or a rotor is disabled (e.g., as part of a routine operation) data associated with the engine or rotor may be omitted when determining the vehicle state.

The vehicle environment model (e.g., the vehicle environment analyzer) may be an example of a machine learning model 325 or any other type of predictive computing component that is configured to receive one or more inputs indicative of a vehicle environment (e.g., weather data, traffic data) and generate one or more outputs indicative of one or more likelihoods that an emergency landing procedure will be successful. As described herein, the one or more outputs may be based on the one or more inputs and/or training data that is utilized to train the vehicle environment model. The vehicle environment model may generate one or more outputs based on environmental conditions, such as weather within a threshold range of a current location of a vehicle. This information may be obtained from vehicle sensors and/or from one or more ground stations (e.g., via air-ground communication interfaces).

The vehicle environment model may be trained using environmental conditions encountered during flight, such as air temperature, weather, and/or turbulence at a given altitude. Additionally, or alternatively, the vehicle environment model may be trained using historical and/or recorded data, which accounts for the actions taken by the pilot and/or the successful or unsuccessful results of such actions. The vehicle environment model may be strengthened with manual and/or automated test validation. One or more onboard vehicle systems, such as a weather radar system, may assist in determining the vehicle environment. Additionally, vehicle environment data uploaded from the ground may also be used to improve the accuracy of the vehicle environment model. The set of systems (vehicle onboard systems and/or ground-based systems) utilized by the environment model may be pre-configured or may be selected based on dynamic scenarios. For example, when an air-ground communication link is not reliable, ground weather data sources may not be utilized in the computing of the vehicle environment.

The landing port model (e.g., the landing port analyzer) may be an example of a machine learning model 325 or any other type of predictive computing component that is configured to receive one or more inputs indicative of a landing port information for a vehicle (e.g., landing port availability, distance to a landing port) and generate one or more outputs indicative of one or more likelihoods that an emergency landing procedure will be successful. As described herein, the one or more outputs may be based on the one or more inputs and/or training data that is utilized to train the landing port model. The landing port model may be configured to analyze possible landing ports based on the current location of a vehicle, a current state of the nearest landing ports, and the landing port visibility.

The potential landing ports near the current vehicle location may come from a landing port database and the current state of the landing ports may be fetched dynamically using one or more air-ground communications systems. The current state of a landing port, such as current occupancy and availability of the landing port may be utilized as inputs to the landing port model. In some examples, the landing port model may analyze visibility for one or more landing ports using one or more sensors, which may include one or more cameras, one or more radio detection and ranging (RADAR) systems, one or more light detection and ranging (LIDAR) systems, or any combination thereof.

The landing port model may be trained using a database of landing ports, which may include state information, availability information, and usability information for each landing port included in the database. Additionally, or alternatively, the landing port model may be trained using images of landing ports with various visibility levels and the altitude information for landing ports. In some examples, the landing port model may be trained using other sensor data, such as data generated by a LIDAR device for sensing the range and distance of a landing port from the current location of the vehicle. The set of systems (onboard and/or ground-based systems) utilized for assessing the landing port availability may be pre-configured or may be selected based on dynamic scenarios.

The communication model (e.g., the air-ground communication link model, the air-ground communication state analyzer) may be an example of a machine learning model 325 or any other type of predictive computing component that is configured to receive one or more inputs indicative of communication information for a vehicle (e.g., communication link quality, communication link speed) and generate one or more outputs indicative of one or more likelihoods that an emergency landing procedure will be successful. As described herein, the one or more outputs may be based on the one or more inputs and/or training data that is utilized to train the communication model.

The communication model plays an important role in the initiation of the auto land operation once the decision to land is taken. All the independent decisions taken by the other analyzers would be continuously published to pilots, crew/passengers, and the ground station for the situational awareness. Once the decision to perform an automated emergency landing procedure is made, the actual landing process has to be initiated/triggered by one or more individuals and/or systems that control the vehicle. For example, one or more pilots, one or more ground crew members, one or more flight crew members, one or more passengers, and/or one or more computing devices may trigger the landing process. A priority order may be utilized in the decision making process for determining whether to perform an automated emergency landing procedure. For example, one or more pilots of a vehicle may be given the first priority for determining whether to perform the automated emergency landing procedure, one or more individuals at a ground station may be given the second priority for determining whether to perform the automated emergency landing procedure, and one or more crew members may be given the third priority for determining whether to perform the automated emergency landing procedure.

If the pilot can approve the decision, the automated emergency landing procedure would be initiated and the same would be conveyed to the ground control. If the pilot is incapacitated or if it as autonomous flight, the next authority to decide this would be the ground control and this requires the reliable air ground communication. In case of communication cutoff, the next approval authority is the crew. This component analyzes the current situation in the vehicle and passes on the baton to the respective HMI interface. If the pilot is not interacting with the Avionics, based on the air ground connectivity the component decides on the approval process to be taken during an emergency.

The communication model may be trained with air-ground connectivity data. The communication model may ascertain the decision-making system about the possible connectivity of the vehicle communication systems with the ground control. Each available air-ground communication link may be configured to assess the air-ground communication state or may be selected based on dynamic scenarios (e.g., when one of the communication links is disabled, it may be ignored in the computation of the air-ground communication state).

An emergency landing model (e.g., an automated emergency landing success factor analyzer) may be an example of a machine learning model 325 or any other type of predictive computing component that is configured to receive one or more inputs indicative of one or more likelihoods that an emergency landing procedure will be successful (e.g., outputs from any one or more of the vehicle state model, the vehicle environment model, the landing port model, and the communication model) and generate one or more outputs indicative of one or more likelihoods that an emergency landing procedure will be successful (e.g., an aggregate emergency landing success probability). As described herein, the one or more outputs may be based on the one or more inputs and/or training data that is utilized to train the emergency landing model. In some examples, the emergency landing model may determine one or more actions to be taken (e.g., one or more recommendations 340) to increase the success factor of an emergency landing given the current flying scenario and may continuously provide a success percentage of landing at the nearby landing ports within a configured radius (e.g., a configured radius of the vehicle).

The emergency landing success probability value 335-*e* (e.g., the success factor) generated by the emergency landing model may provide situational awareness to a pilot to determine if an emergency landing process should be initiated to land the vehicle at a nearby landing port. If the emergency landing success probability value 335 predicted by the emergency landing model is not favorable (e.g., does not satisfy a threshold value), then the pilot may not land the vehicle at a predetermined landing port and instead perform a forced landing below a current flying area to ensure the safety of the passengers.

Each model described herein may independently provide outputs via a respective results indicator (e.g., a dial, gauge, or any other type of indicator, which may be displayed via a user interface). Displaying results from each model may also improve situational awareness for the pilot, ground station, and crew members. In some examples, the results may be provided to the ground station and/or the flight crew, which may enable one or more individuals at a ground station and/or one or more flight crew members to select or otherwise initiate an emergency landing procedure (e.g., an automated emergency landing procedure) in a scenario where one or more pilots is incapacitated.

In some embodiments, a training dataset 330 may include information that is utilized to train a model, such as a machine learning model 325. A training dataset 330 may enable a model to determine one or more relationships between inputs and outputs. In some examples, a training dataset 330 may include labelled or unlabeled training data. In some examples, a training dataset 330 may include historical data and/or simulation data.

As described herein, a training dataset 330 may include historical data relating to historical emergency landing events. Such a training dataset 330 may include historical vehicle state conditions, historical environmental conditions, historical landing port conditions, historical communication conditions, or any combination thereof. Additionally, or alternatively, such a training dataset 330 may include one or more emergency landing outcomes (e.g., indicative of whether an emergency landing was successful). Accordingly, providing a model with the training dataset 330 may enable the model to determine one or more relationships between various conditions and emergency landing outcomes, such that the model may learn how to predict one or more emergency landing success probability values 335 based on various input values indicative of current conditions associated with a vehicle.

In some examples, a training dataset 330 may include simulated data in addition to, or as an alternative to historical data. The simulated data include simulated emergency landing outcomes for a variety of vehicle conditions, such as simulated vehicle state conditions, simulated environmental conditions, simulated landing port conditions, simulated communication conditions, or any combination thereof. As described herein, providing a model with the simulated data and/or the historical data may enable the model to determine one or more relationships between various conditions and emergency landing success probability values 335 based on various input values indicative of current conditions associated with a vehicle. In some examples, each machine learning model 325 of the ensemble machine learning model 325 may be trained independently, using one or more respective training datasets 330 specific to each machine learning model 325. For example, a vehicle state model may be trained using a first historical training dataset 330 and/or a first simulated training dataset 330, a vehicle environment model may be trained using a second historical training dataset 330 and/or a second simulated training dataset 330, and so forth for each model of the ensemble machine learning model 325.

In some examples, the one or more processors 202 may generate an emergency landing success probability value 335-*c*, the emergency landing success probability value 335-*c* based on one or more landing port conditions 315, wherein the third emergency landing success probability value is based on the emergency landing success probability value 335-*c*. In some embodiments, a landing port condition 315 may be a condition, state, characteristic, or configuration associated with a landing port (e.g., an airport, a vertiport, and/or the like). In some examples, a landing port condition 315 may be utilized to generate or otherwise compute one or more emergency landing success probability values 335 (e.g., one or more emergency landing success probability values 335-*c*). Some non-limiting examples of landing port conditions 315 include landing port weather conditions, landing port traffic conditions, landing port runway availability conditions, and/or the like. As described herein, a third machine learning model 325, such as a landing port model may generate one or more predictive outputs based on one or more landing port conditions 315.

In some examples, the one or more processors 202 may cause one or more communications circuitry to provide, to a ground-based computing device, a recommendation 340 for improving the emergency landing success probability value 335-*c*. In some examples, the recommendation 340 may include an indication to clear a potential emergency landing site of one or more obstacles. In some embodiments, a recommendation 340 may be a message or indication of a suggested or advised action. For example, one or more processors 202 may provide, via one or more user interfaces, a recommendation 340 for improving one or more emergency landing success probability values 335. In some examples, the recommendation 340 may be provided to a ground-based computing device (e.g., a user interface of a ground-based computing device) and/or to a vehicle-based computing device (e.g., a user interface of a vehicle-based computing device). In such examples, the recommendation 340 may enable or otherwise cause one or more individuals (e.g., one or more pilots, one or more ground or air crew members) to perform one or more actions, which may improve one or more emergency landing success probability values 335, thereby improving vehicle safety.

In some embodiments, a potential emergency landing site may be a region of a landing port (e.g., a runway at an airport) or an emergency landing region that is not associated with a landing port (e.g., a highway, a body of water, a flat region of rural land) where a vehicle may land. In some examples, the potential emergency landing site may be selected by one or more processors 202 (e.g., based on one or more emergency landing success probability values 335). As described herein, an emergency landing success probability value 335 for a potential emergency landing site may be generated or otherwise determined based on one or more landing port conditions 315. For example, a first vehicle may be located on a potential emergency landing site (e.g., on a runway) and one or more processors 202 may determine one or more emergency landing success probability values 335 for a second vehicle based on the first vehicle being located on the potential emergency landing site. In such examples, the one or more processors 202 may provide a recommendation 340 to one or more computing devices (e.g., a ground-based computing device at an airport, a computing device of the first vehicle) to clear the emergency landing site. For example, the recommendation 340 may request that the first vehicle be removed from the potential emergency landing site, which, when completed, may improve the one or more emergency landing success probability values 335.

In some embodiments, an obstacle may be an object or obstruction that impedes or has the potential to impede the movement of a vehicle. For example, a vehicle located at a potential emergency landing site (e.g., an aircraft on a runway) may be an example of an obstacle. As described herein, some other non-limiting examples of obstacles may include buildings, terrain (e.g., trees, mountains, bodies of water), people, infrastructure (e.g., power lines, utility poles), and/or the like. In some examples, a landing port condition 315 may include whether one or more obstacles are present or are planned to be present at a respective landing port.

In some examples, the one or more processors 202 may provide, to a user interface of the vehicle, a recommendation 340 for improving the emergency landing success probability value 335-*a*. In some embodiments, a user interface may include hardware and/or software that is configured to interface with one or more individuals. For example, a user interface may be a device that receives one or more inputs from a user and/or provides one or more outputs to the user, such as a monitor, a display, a speaker, a microphone, a printer, a keyboard, a mouse, a joystick, and/or the like. In some examples, a user interface may be a software application, such as a graphical user interface that is displayed and/or executed on a computing device. In some examples, a user interface may provide an audio and/or visual representation of information. For example, a user interface of a vehicle, such as a display of a flight management system or any other computing device associated with a vehicle (e.g., one or more ground-based computing devices), may provide one or more indications of one or more emergency landing success probability values 335. Additionally, or alternatively, a user interface may provide one or more recommendations 340 (e.g., audio or text that indicates one or more recommendations 340) for improving one or more emergency landing success probability values 335.

In some examples, the one or more processors 202 may generate an emergency landing success probability value 335-*d*. The emergency landing success probability value 335-*d* may be based on one or more communication state conditions 320 for the vehicle. In some examples, the third emergency landing success probability value may be based on the emergency landing success probability value 335-*d*. In some embodiments, a communication state condition 320 may be a condition, state, characteristic, or configuration associated with one or more communication links. For example, a communication state condition 320 may be a condition of an air to ground communication link between an aircraft and a ground station. In some examples, a communication state condition 320 may be utilized to generate or otherwise compute one or more emergency landing success probability values 335 (e.g., one or more emergency landing success probability values 335-*d*). Some non-limiting examples of communication state conditions 320 include a communication link interface condition, a communication link through put condition, a communication link quality condition, a communication link availability condition, and/or the like. As described herein, a fourth machine learning model 325, such as a communication model may generate one or more predictive outputs based on one or more communication state conditions 320.

In some examples, the emergency landing success probability value 335-*e* is indicative of a probability that an automated emergency landing procedure will be successful. In some examples, one or more of the emergency landing success probability value 335-*a*, the emergency landing success probability value 335-*b*, or the emergency landing success probability value 335-*e* may be generated periodically during a flight time period for the vehicle.

In some examples, generating the emergency landing success probability value 335-*e* is triggered by one or more of the emergency landing success probability value 335-*a* satisfying a first threshold or the emergency landing success probability value 335-*b* satisfying a second threshold.

In some embodiments, a threshold may be a value or limit for determining whether one or more actions and/or operations should be performed. For example, one or more processors 202 may generate or otherwise output one or more emergency landing success probability values 335 based on one or more thresholds being satisfied. More specifically, an emergency landing success probability value 335-*e* (e.g., an aggregate probability value) may be generated if one or more emergency landing success probability values 335 satisfy (e.g., are greater than or equal to) one or more probability value thresholds.

Figure 4:
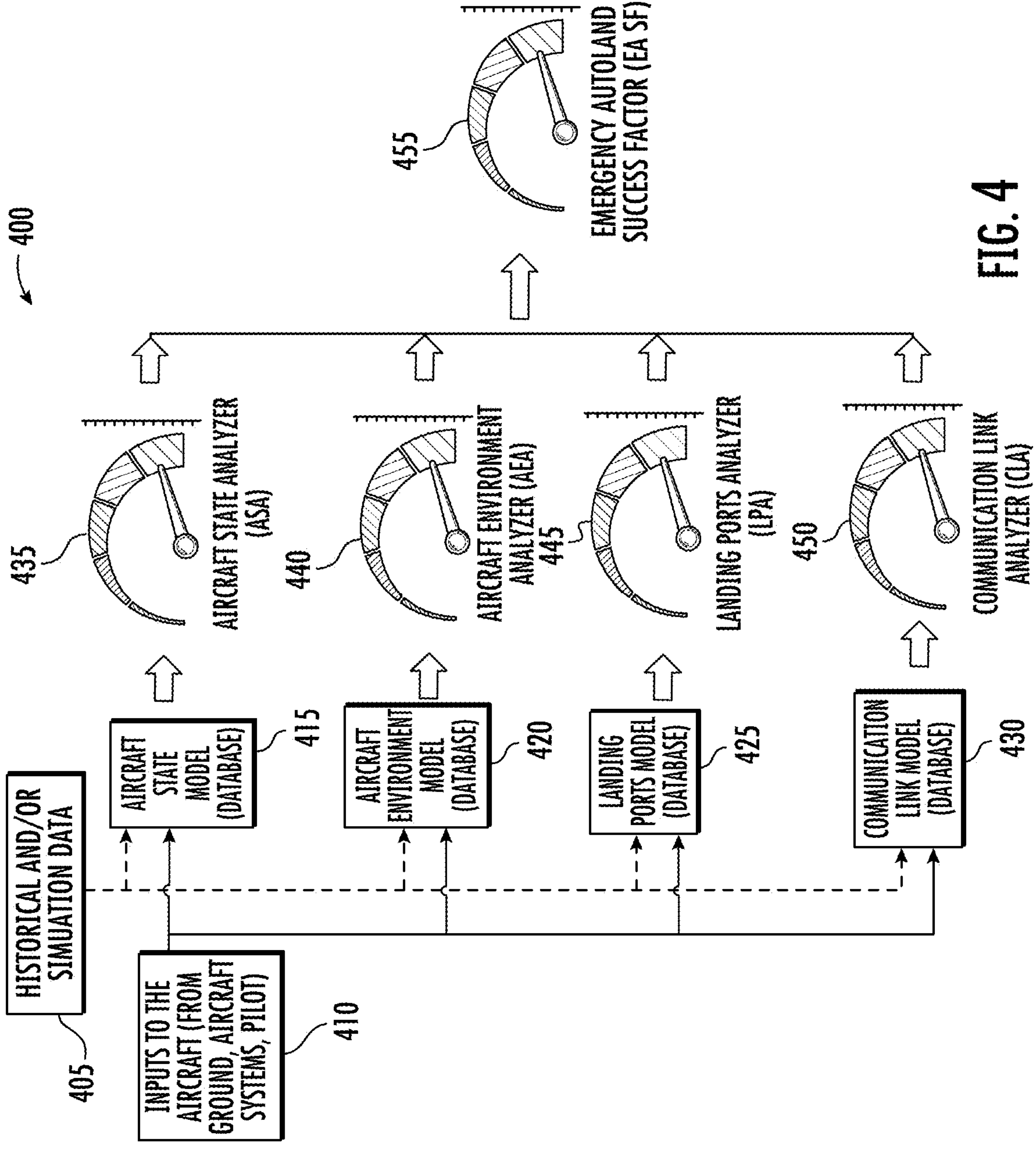
FIG. 4 is an operational example of a user interface that supports real-time, multi-factor prediction of emergency landing success probabilities using machine learning in accordance with one or more embodiments of the present disclosure.

FIG. 4 is an operational example 400 of a system architecture that supports real-time, multi-factor prediction of emergency landing success probabilities using machine learning in accordance with one or more embodiments of the present disclosure. The system architecture may be implemented by one or more computing entities, which may execute or otherwise host one or more models. As shown, the system architecture may include historical and/or simulation data 405, which may be input to one or more models and/or databases, such as an aircraft state database 415, an aircraft environment database 420, a landing port database 425, a communication link database 430, or any combination thereof. In some examples, the historical and/or simulation data 405 may be included in one or more training datasets 330 as described with reference to FIG. 3.

In some examples, any of the one or more databases described herein may receive one or more inputs 410. The one or more inputs 410 may be received from one or more ground-based computing devices, one or more aircraft systems, and/or from one or more users (e.g., via a user interface). In some examples, the one or more inputs 410 may be based on or may otherwise be indicative of one or more vehicle state conditions 305, one or more environmental state conditions 310, one or more landing port conditions 315, one or more communication state conditions 320, or any combination thereof. In some examples, the one or more inputs 410 may be blended with the historical and/or simulation data 405 to generate the one or more databases.

The system architecture may include one or more analyzers (e.g., models), such as an aircraft state analyzer 435, an aircraft environment analyzer 440, a landing port analyzer 445, a communication link analyzer 450, an emergency autoland success factor (EASF) analyzer 455, or any combination thereof. In some examples, the one or more analyzers may be examples of machine learning models 325 as described with reference to FIG. 3. As described herein, the one or more analyzers may receive data from the one or more databases and generate one or more outputs (e.g., predictions, emergency landing success probability values) based on the data. In some examples, the one or more outputs may be displayed via one or more user interfaces using a dial graphical representation, which may include indications of predicted values and/or color-coded representations of predicted values.

Figure 5:
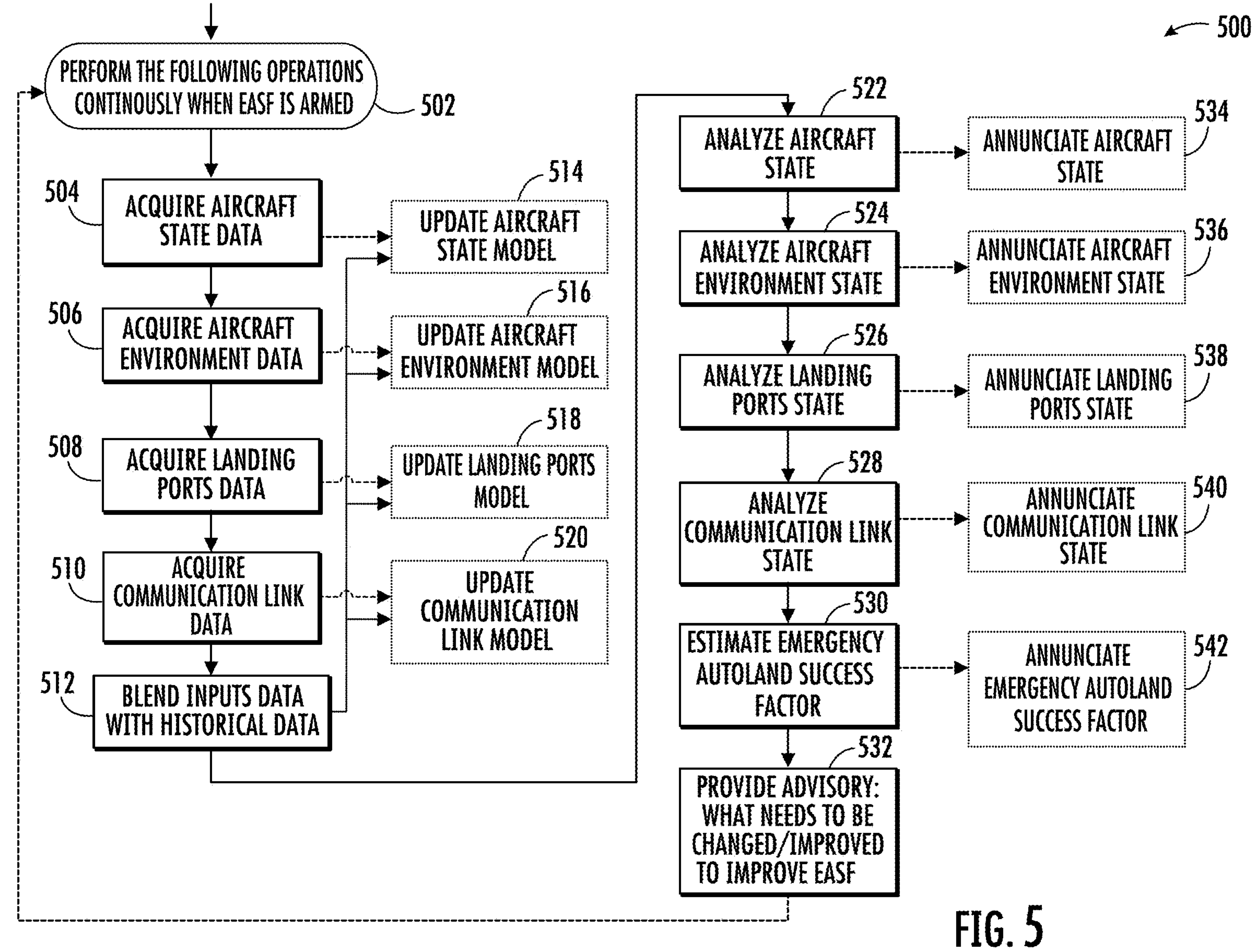
FIG. 5 is an operational example of a user interface that supports real-time, multi-factor prediction of emergency landing success probabilities using machine learning in accordance with one or more embodiments of the present disclosure.

FIG. 5 is an operational example 500 of a process that supports real-time, multi-factor prediction of emergency landing success probabilities using machine learning in accordance with one or more embodiments of the present disclosure. Specifically, FIG. 5 depicts operations of the process. In some embodiments, the process is embodied by computer program code stored on a non-transitory computer-readable storage medium of a computer program product configured for execution to perform the process as depicted and described. Additionally, or alternatively, in some embodiments, the process is performed by at least one specially configured computing device, such as at least one computing device 200 alone or in communication with at least one other component, device, system, and/or the like. In this regard, in some such embodiments, the computing device 200 is specially configured by computer-coded instructions (e.g., computer program instructions) stored thereon, for example in the memory 204 and/or another component depicted and/or described herein and/or otherwise accessible to the computing device 200, for performing the operations as depicted and described. In some embodiments, the computing device 200 is in communication with at least one external apparatus, system, device, and/or the like, to perform at least one of the operations as depicted and described. For example, the computing device 200, in some embodiments, is in communication with an external computing device, a client device, and/or the like. For purposes of simplifying the description, the process is described as performed by and from the perspective of the computing device 200.

The process begins at operation 502. At operation 502, the computing device 200 includes means such as the sensors 210, navigation circuitry 212, flight operations circuitry 214, virtual management circuitry 216, communications circuitry 208, input/output circuitry 206, one or more processors 202, or a combination thereof, to initiate or otherwise cause one or more operations to be performed continuously and/or at a periodic time interval while one or more conditions is satisfied, such as a vehicle being in a flight phase or while one or more functionalities is activated (e.g., while an EASF analyzer is armed).

At operation 504, the computing device 200 includes means such as the sensors 210, navigation circuitry 212, flight operations circuitry 214, virtual management circuitry 216, communications circuitry 208, input/output circuitry 206, one or more processors 202, or a combination thereof, to retrieve or otherwise acquire aircraft state data.

At operation 506, the computing device 200 includes means such as the sensors 210, navigation circuitry 212, flight operations circuitry 214, virtual management circuitry 216, communications circuitry 208, input/output circuitry 206, one or more processors 202, or a combination thereof, to retrieve or otherwise acquire aircraft environment data.

At operation 508, the computing device 200 includes means such as the sensors 210, navigation circuitry 212, flight operations circuitry 214, virtual management circuitry 216, communications circuitry 208, input/output circuitry 206, one or more processors 202, or a combination thereof, to retrieve or otherwise acquire landing port data.

At operation 510, the computing device 200 includes means such as the sensors 210, navigation circuitry 212, flight operations circuitry 214, virtual management circuitry 216, communications circuitry 208, input/output circuitry 206, one or more processors 202, or a combination thereof, to retrieve or otherwise acquire communication link data.

At operation 512, the computing device 200 includes means such as the sensors 210, navigation circuitry 212, flight operations circuitry 214, virtual management circuitry 216, communications circuitry 208, input/output circuitry 206, one or more processors 202, or a combination thereof, to perform one or more operations to combine or otherwise blend input data with historical and/or simulation data. For example, the one or more operations may include combining any one or more of aircraft state data, aircraft environment data, landing port data, and communication link data with historical and/or simulation data.

At operation 514, the computing device 200 includes means such as the sensors 210, navigation circuitry 212, flight operations circuitry 214, virtual management circuitry 216, communications circuitry 208, input/output circuitry 206, one or more processors 202, or a combination thereof, to update an aircraft state model (e.g., using any one or more of aircraft state data, historical data, or simulation data).

At operation 516, the computing device 200 includes means such as the sensors 210, navigation circuitry 212, flight operations circuitry 214, virtual management circuitry 216, communications circuitry 208, input/output circuitry 206, one or more processors 202, or a combination thereof, to update an aircraft environment model (e.g., using any one or more of aircraft environment data, historical data, or simulation data).

At operation 518, the computing device 200 includes means such as the sensors 210, navigation circuitry 212, flight operations circuitry 214, virtual management circuitry 216, communications circuitry 208, input/output circuitry 206, one or more processors 202, or a combination thereof, to update a landing port model (e.g., using any one or more of landing port data, historical data, or simulation data).

At operation 520, the computing device 200 includes means such as the sensors 210, navigation circuitry 212, flight operations circuitry 214, virtual management circuitry 216, communications circuitry 208, input/output circuitry 206, one or more processors 202, or a combination thereof, to update a communication link model (e.g., using any one or more of communication link data, historical data, or simulation data).

At operation 522, the computing device 200 includes means such as the sensors 210, navigation circuitry 212, flight operations circuitry 214, virtual management circuitry 216, communications circuitry 208, input/output circuitry 206, one or more processors 202, or a combination thereof, to analyze an aircraft state. For example, the computing device 200 may generate one or more emergency landing success probability values based on the aircraft state.

At operation 524, the computing device 200 includes means such as the sensors 210, navigation circuitry 212, flight operations circuitry 214, virtual management circuitry 216, communications circuitry 208, input/output circuitry 206, one or more processors 202, or a combination thereof, to analyze an environment state. For example, the computing device 200 may generate one or more emergency landing success probability values based on the environment state.

At operation 526, the computing device 200 includes means such as the sensors 210, navigation circuitry 212, flight operations circuitry 214, virtual management circuitry 216, communications circuitry 208, input/output circuitry 206, one or more processors 202, or a combination thereof, to analyze a landing port state. For example, the computing device 200 may generate one or more emergency landing success probability values based on the landing port state.

At operation 528, the computing device 200 includes means such as the sensors 210, navigation circuitry 212, flight operations circuitry 214, virtual management circuitry 216, communications circuitry 208, input/output circuitry 206, one or more processors 202, or a combination thereof, to analyze a communication link state. For example, the computing device 200 may generate one or more emergency landing success probability values based on the communication link state.

At operation 530, the computing device 200 includes means such as the sensors 210, navigation circuitry 212, flight operations circuitry 214, virtual management circuitry 216, communications circuitry 208, input/output circuitry

206, one or more processors 202, or a combination thereof, to estimate or otherwise generate an emergency autoland success factor (e.g., a third emergency landing success probability value).

At operation 532, the computing device 200 includes means such as the sensors 210, navigation circuitry 212, flight operations circuitry 214, virtual management circuitry 216, communications circuitry 208, input/output circuitry 206, one or more processors 202, or a combination thereof, to generate and/or provide one or more recommendations for improving the emergency autoland success factor.

At operation 534, the computing device 200 includes means such as the sensors 210, navigation circuitry 212, flight operations circuitry 214, virtual management circuitry 216, communications circuitry 208, input/output circuitry 206, one or more processors 202, or a combination thereof, to provide, communicate, or otherwise transmit an indication of an aircraft state and/or an emergency landing success probability value based on the aircraft state.

At operation 536, the computing device 200 includes means such as the sensors 210, navigation circuitry 212, flight operations circuitry 214, virtual management circuitry 216, communications circuitry 208, input/output circuitry 206, one or more processors 202, or a combination thereof, to provide, communicate, or otherwise transmit an indication of an environment state and/or an emergency landing success probability value based on the environment state.

At operation 538, the computing device 200 includes means such as the sensors 210, navigation circuitry 212, flight operations circuitry 214, virtual management circuitry 216, communications circuitry 208, input/output circuitry 206, one or more processors 202, or a combination thereof, to provide, communicate, or otherwise transmit an indication of a landing port state and/or an emergency landing success probability value based on the landing port state.

At operation 540, the computing device 200 includes means such as the sensors 210, navigation circuitry 212, flight operations circuitry 214, virtual management circuitry 216, communications circuitry 208, input/output circuitry 206, one or more processors 202, or a combination thereof, to provide, communicate, or otherwise transmit an indication of a communication link state and/or an emergency landing success probability value based on the communication link state.

At operation 542, the computing device 200 includes means such as the sensors 210, navigation circuitry 212, flight operations circuitry 214, virtual management circuitry 216, communications circuitry 208, input/output circuitry 206, one or more processors 202, or a combination thereof, to provide, communicate, or otherwise transmit an indication of an emergency landing success probability value (e.g., a third emergency landing success probability value).

Figure 6:
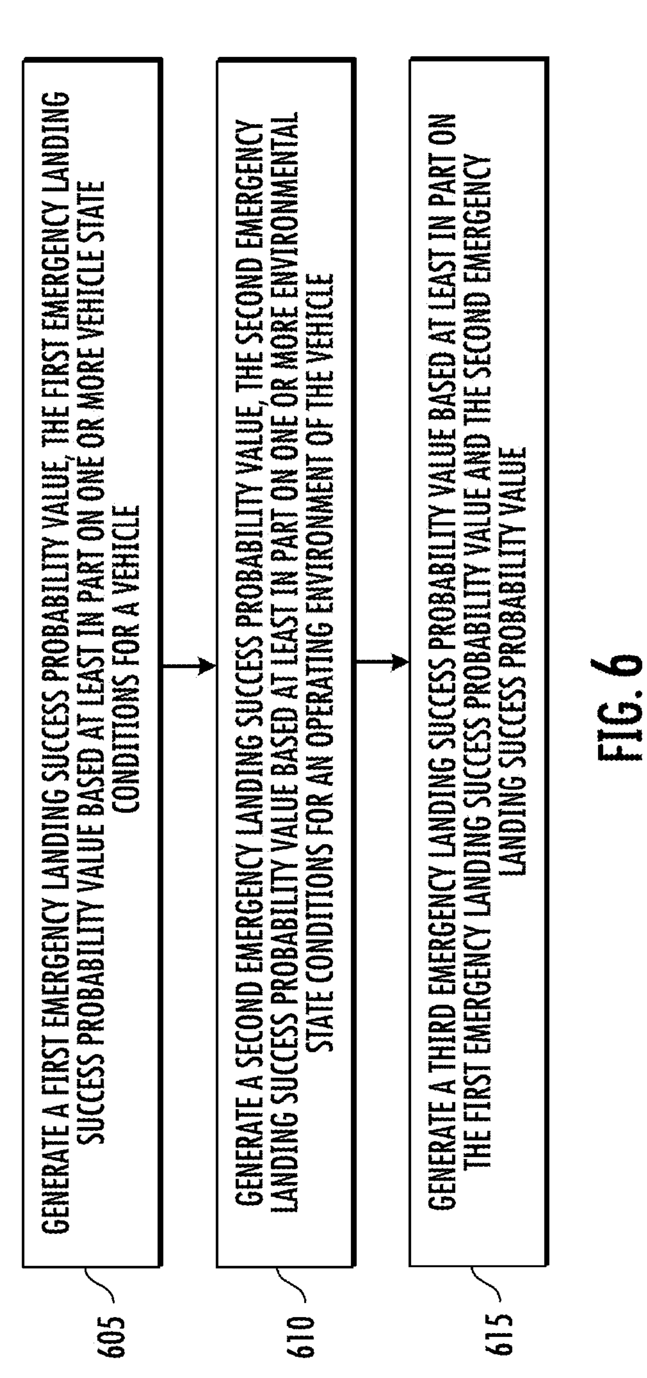
FIG. 6 illustrates a process for real-time, multi-factor prediction of emergency landing success probabilities using machine learning in accordance with one or more embodiments of the present disclosure.

FIG. 6 illustrates a process 600 for real-time, multi-factor prediction of emergency landing success probabilities using machine learning in accordance with one or more embodiments of the present disclosure. Specifically, FIG. 6 depicts operations of an example process 600. In some embodiments, the process 600 is embodied by computer program code stored on a non-transitory computer-readable storage medium of a computer program product configured for execution to perform the process as depicted and described. Additionally, or alternatively, in some embodiments, the process 600 is performed by at least one specially configured computing device, such as at least one computing device 200 alone or in communication with at least one other component, device, system, and/or the like. In this regard, in some such embodiments, the computing device 200 is specially configured by computer-coded instructions (e.g., computer program instructions) stored thereon, for example in the memory 204 and/or another component depicted and/or described herein and/or otherwise accessible to the computing device 200, for performing the operations as depicted and described. In some embodiments, the computing device 200 is in communication with at least one external apparatus, system, device, and/or the like, to perform at least one of the operations as depicted and described. For example, the computing device 200, in some embodiments, is in communication with an external computing device, a client device, and/or the like. For purposes of simplifying the description, the process 600 is described as performed by and from the perspective of the computing device 200.

The process 600 begins at operation 605. At operation 605, the computing device 200 includes means such as the sensors 210, navigation circuitry 212, flight operations circuitry 214, virtual management circuitry 216, communications circuitry 208, input/output circuitry 206, one or more processors 202, or a combination thereof, to generate a first emergency landing success probability value, the first emergency landing success probability value based at least in part on one or more vehicle state conditions for a vehicle.

At operation 610, the computing device 200 includes means such as the sensors 210, navigation circuitry 212, flight operations circuitry 214, virtual management circuitry 216, communications circuitry 208, input/output circuitry 206, one or more processors 202, or a combination thereof, to generate a second emergency landing success probability value, the second emergency landing success probability value based at least in part on one or more environmental state conditions for an operating environment of the vehicle.

At operation 615, the computing device 200 includes means such as the sensors 210, navigation circuitry 212, flight operations circuitry 214, virtual management circuitry 216, communications circuitry 208, input/output circuitry 206, one or more processors 202, or a combination thereof, to generate a third emergency landing success probability value based at least in part on the first emergency landing success probability value and the second emergency landing success probability value.

CONCLUSION

Many modifications and other embodiments of the disclosure set forth herein will come to mind to one skilled in the art to which this disclosure pertains having the benefit of the teachings presented in the foregoing description and the associated drawings. Therefore, it is to be understood that the embodiments are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

In some embodiments, some of the operations above may be modified or further amplified. Furthermore, in some embodiments, additional optional operations may be included. Modifications, amplifications, or additions to the operations above may be performed in any order and in any combination.

Although an example processing system has been described above, implementations of the subject matter and the functional operations described herein can be implemented in other types of digital electronic circuitry, or in computer software, firmware, or hardware, including the structures disclosed in this specification and their structural equivalents, or in various combinations.

Embodiments of the subject matter and the operations described herein can be implemented in digital electronic circuitry, or in computer software, firmware, or hardware, including the structures disclosed in this specification and their structural equivalents, or in various combinations. Embodiments of the subject matter described herein can be implemented as at least one computer program, i.e., at least one module of computer program instructions, encoded on computer storage medium for execution by, or to control the operation of, information/data processing apparatus. Alternatively, or in addition, the program instructions can be encoded on an artificially generated, propagated signal, e.g., a machine-generated electrical, optical, or electromagnetic signal, which is generated to encode information/data for transmission to suitable receiver apparatus for execution by an information/data processing apparatus. A computer storage medium can be, or be included in, a computer-readable storage device, a computer-readable storage substrate, a random or serial access memory array or device, or a combination. Moreover, while a computer storage medium is not a propagated signal, a computer storage medium can be a source or destination of computer program instructions encoded in an artificially generated, propagated signal. The computer storage medium can also be, or be included in, at least one separate physical component or media (e.g., multiple CDs, disks, or other storage devices).

The operations described herein can be implemented as operations performed by an information/data processing apparatus on information/data stored on at least one computer-readable storage device or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a repository management system, an operating system, a cross-platform runtime environment, a virtual machine, or any combination thereof. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or information/data (e.g., at least one script stored in a markup language document), in a single file dedicated to the program in question, or in multiple coordinated files (e.g., files that store at least one module, sub-program, or portion of code). A computer program can be deployed to be executed on one computer or on multiple computers that are located at one site or distributed across multiple sites and interconnected by a communication network.

The processes and logic flows described herein can be performed by at least one programmable processor executing at least one computer program to perform actions by operating on input information/data and generating output. Processors suitable for the execution of a computer program include, by way of example, both general and special purpose microprocessors, and any processor of any kind of digital computer. Generally, a processor will receive instructions and information/data from a read-only memory or a random access memory or both. The essential elements of a computer are a processor for performing actions in accordance with instructions and at least one memory device for storing instructions and data. Generally, a computer will also include, or be operatively coupled to receive information/data from or transfer information/data to, or both, at least one mass storage device for storing data, e.g., magnetic, magneto-optical disks, or optical disks.

However, a computer need not have such devices. Devices suitable for storing computer program instructions and information/data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described herein can be implemented on a computer having a display device, e.g., a CRT (cathode ray tube) or LCD (liquid crystal display) monitor, for displaying information/data to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described herein can be implemented in a computing system that includes a back-end component, e.g., as an information/data server, or that includes a middleware component, e.g., an application server, or that includes a front-end component, e.g., a client computer having a graphical user interface or a web browser through which a user can interact with an implementation of the subject matter described herein, or any combination of at least one such back-end, middleware, or front-end components. The components of the system can be interconnected by any form or medium of digital information/data communication, e.g., a communication network. Examples of communication networks include a local area network ("LAN")

and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits information/data (e.g., an HTML page) to a client device (e.g., for purposes of displaying information/data to and receiving user input from a user interacting with the client device). Information/data generated at the client device (e.g., a result of the user interaction) can be received from the client device at the server.

While this specification contains many specific implementation details, these should not be construed as limitations on the scope of any disclosures or of what may be claimed, but rather as descriptions of features specific to particular embodiments of particular disclosures. Certain features that are described herein in the context of separate embodiments can also be implemented in combination in a single embodiment.

Conversely, various features that are described in the context of a single embodiment can also be implemented in multiple embodiments separately or in any suitable sub combination. Moreover, although features may be described above as acting in certain combinations and even initially claimed as such, at least one feature from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method comprising:

retrieving a vehicle state condition of a vehicle;

applying the vehicle state condition to a vehicle state machine learning model to generate a vehicle state related emergency landing success probability value indicative of a first probability that the vehicle will perform a successful emergency landing procedure;

retrieving a communication link condition of the vehicle;

applying the communication link condition to a communication link machine learning model to generate a communication link related emergency landing success probability value indicative of a second probability that the vehicle will perform the successful emergency landing procedure, wherein the first probability is different than the second probability;

applying the vehicle state related emergency landing success probability value and the communication link related emergency landing success probability value to an emergency landing machine learning model to generate an emergency landing success probability value indicative of a third probability value that the vehicle will perform the successful emergency landing procedure; and causing initiation of an emergency landing procedure based on the emergency landing success probability value.

2. The method of claim 1, wherein:

the vehicle state machine learning model is trained using (i) a first training dataset generated using one or more first simulations and (ii) a second training dataset comprising first historical vehicle incident data; and the communication link machine learning model is trained using (a) a third training dataset generated using one or more second simulations and (b) a fourth training dataset comprising second historical vehicle incident data.

3. The method of claim 1, further comprising:

generating a landing port related emergency landing success probability value, the landing port related emergency landing success probability value based at least in part on one or more landing port conditions, wherein the emergency landing success probability value is based at least in part on the landing port related emergency landing success probability value.

4. The method of claim 3, further comprising:

providing, to a ground-based computing device, a recommendation for improving the landing port related emergency landing success probability value, wherein the recommendation comprises an indication to clear a potential emergency landing site of one or more obstacles.

5. The method of claim 1, further comprising:

providing, to a user interface of the vehicle, a recommendation for improving the vehicle state related emergency landing success probability value.

6. The method of claim 1, wherein one or more of (i) the vehicle state related emergency landing success probability value, (ii) the communication link related emergency landing success probability value, or (iii) the emergency landing success probability value are generated periodically during a flight time period for the vehicle.

7. The method of claim 1, wherein generating the emergency landing success probability value is triggered by one or more of (i) the vehicle state related emergency landing success probability value satisfying a first threshold or (ii) the communication link related emergency landing success probability value satisfying a second threshold.

8. A system comprising:

a user interface; and one or more processors in communication with the user interface, the one or more processors configured to:

retrieve a vehicle state condition of a vehicle;

apply the vehicle state condition to a vehicle state machine learning model to generate a vehicle state related emergency landing success probability value indicative of a first probability that the vehicle will perform a successful emergency landing procedure;

retrieve a communication link condition of the vehicle;

apply the communication link condition to a communication link machine learning model to generate a communication link related emergency landing success probability value indicative of a second probability that the vehicle will perform the successful emergency landing procedure, wherein the first probability is different than the second probability;

apply the vehicle state related emergency landing success probability value and the communication link related emergency landing success probability value to an emergency landing machine learning model to generate an emergency landing success probability value indicative of a third probability value that the vehicle will perform the successful emergency landing procedure; and cause initiation of an emergency landing procedure based on the emergency landing success probability value.

9. The system of claim 8, wherein:

the vehicle state machine learning model is trained using (i) a first training dataset generated using one or more first simulations and (ii) a second training dataset comprising first historical vehicle incident data; and the communication link machine learning model is trained using (a) a third training dataset generated using one or more second simulations and (b) a fourth training dataset comprising second historical vehicle incident data.

10. The system of claim 8, wherein the one or more processors are further configured to:

generate a landing port related emergency landing success probability value, the landing port related emergency landing success probability value based at least in part on one or more landing port conditions, wherein the emergency landing success probability value is based at least in part on the landing port related emergency landing success probability value.

11. The system of claim 10, wherein the one or more processors are further configured to:

provide, to a ground-based computing device, a recommendation for improving the landing port related emergency landing success probability value, wherein the recommendation comprises an indication to clear a potential emergency landing site of one or more obstacles.

12. The system of claim 8, wherein the one or more processors are further configured to:

provide, to the user interface, a recommendation for improving the emergency landing success probability value.

13. The system of claim 8, wherein one or more of (i) the vehicle state related emergency landing success probability value, (ii) the communication link related emergency landing success probability value, or (iii) the emergency landing success probability value are generated periodically during a flight time period for the vehicle.

14. The system of claim 8, wherein generating the emergency landing success probability value is triggered by one or more of (i) the vehicle state related emergency landing success probability value satisfying a first threshold or (ii) the communication link related emergency landing success probability value satisfying a second threshold.

15. An apparatus comprising:

one or more processors; and a memory storing instructions that, when executed by the one or more processors, cause the apparatus to:

retrieve a vehicle state condition of a vehicle;

apply the vehicle state condition to a vehicle state machine learning model to generate a vehicle state related emergency landing success probability value indicative of a first probability that the vehicle will perform a successful emergency landing procedure;

retrieve a communication link condition of the vehicle;

apply the communication link condition to a communication link machine learning model to generate a communication link related emergency landing success probability value indicative of a second probability that the vehicle will perform the successful emergency landing procedure, wherein the first probability is different than the second probability;

apply the vehicle state related emergency landing success probability value and the communication link related emergency landing success probability value to an emergency landing machine learning model to generate an emergency landing success probability value indicative of a third probability value that the vehicle will perform the successful emergency landing procedure; and cause initiation of an emergency landing procedure based on the emergency landing success probability value.

16. The apparatus of claim 15, wherein:

the vehicle state machine learning model is trained using (i) a first training dataset generated using one or more first simulations and (ii) a second training dataset comprising first historical vehicle incident data; and the communication link machine learning model is trained using (a) a third training dataset generated using one or more second simulations and (b) a fourth training dataset comprising second historical vehicle incident data.

* * * * *